US012688486B2

(12) United States Patent
Govindaraju et al.

(10) Patent No.: US 12,688,486 B2
(45) Date of Patent: Jul. 21, 2026

(54) METHOD AND A SYSTEM FOR OPTIMIZING E-COMMERCE MARKDOWN PRICE BASED ON CONTEXTUAL BANDIT TECHNIQUE

(71) Applicant: Tata Consultancy Services Limited, Mumbai (IN)

(72) Inventors: Uma Maheswari Govindaraju, Chennai (IN); Srividhya Sethuraman, Chennai (IN); Sharadha Ramanan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 107 days.

(21) Appl. No.: 18/757,249

(22) Filed: Jun. 27, 2024

(65) Prior Publication Data

US 2025/0021932 A1 Jan. 16, 2025

(30) Foreign Application Priority Data

Jul. 14, 2023 (IN) ............................. 202321047614

(51) Int. Cl.
*G06Q 10/087* (2023.01)
*G06Q 30/0201* (2023.01)
*G06Q 30/0202* (2023.01)

(52) U.S. Cl.
CPC ....... *G06Q 10/087* (2013.01); *G06Q 30/0202* (2013.01); *G06Q 30/0206* (2013.01)

(58) Field of Classification Search
CPC ........... G06Q 30/0206; G06Q 30/0222; G06Q 30/0283; G06Q 30/0207; G06Q 30/02
See application file for complete search history.

(56) References Cited

U.S. PATENT DOCUMENTS 7,251,615 B2 * 7/2007 Woo ................. G06Q 10/06375 703/2
7,481,367 B2 * 1/2009 Fees ................... G06Q 30/0283 235/383

(Continued)

FOREIGN PATENT DOCUMENTS

WO WO2020209985 A1 10/2020

OTHER PUBLICATIONS

Burman, Vibhati et al., Markdown Pricing For a Large Scale Retailer 2021 IEEE International Conference on Big Data, 2021 (Year: 2021).*

(Continued)

*Primary Examiner* — Scott L Jarrett
(74) *Attorney, Agent, or Firm* — Finnegan, Henderson, Farabow, Garrett & Dunner, LLP

(57) ABSTRACT

This disclosure relates generally to optimizing markdown price and, more particularly, to a method and a system for optimizing E-commerce markdown price based on contextual bandit technique. E-commerce and retail industries employ several strategies to boost business, of which markdown pricing is popular. The online markdown pricing problem is particularly challenging due to the high variability in demand. The existing state-of-art CB based techniques to optimize the markdown price, are designed to either clear off maximum inventory or as a revenue maximization problem and do not explicitly consider contextual features. The disclosed techniques optimize E-commerce markdown price based on contextual bandit technique focusing on both margin optimization and inventory reduction, while considering contextual features by employing a suite of Contextual Bandit (CB) algorithms, including LinUCB, Mini-monster in Vowpal Wabbit (VW), Contextual Thompson Sampling (Continued)

(CTS), and Bayes Upper Confidence Bounds (UCB), which tackle the dynamic nature of e-commerce.

20 Claims, 12 Drawing Sheets

(56)                     References Cited

U.S. PATENT DOCUMENTS

| | | | |
|---|---|---|---|
| 7,979,299 B1 * | 7/2011 | Mehta | G06Q 30/06 |
| | | | 705/7.29 |
| 8,000,996 B1 * | 8/2011 | Sanli | G06Q 30/02 |
| | | | 705/7.35 |
| 10,528,903 B2 * | 1/2020 | Kannan | G06Q 30/0283 |
| 10,839,420 B2 * | 11/2020 | Chen | G06Q 30/0249 |
| 10,970,733 B2 * | 4/2021 | Yang | G06Q 30/0211 |
| 11,423,344 B2 * | 8/2022 | Kannan | G06Q 10/06315 |
| 11,429,992 B2 * | 8/2022 | Ganti Mahapatruni | G06N 5/01 |
| 11,532,000 B2 * | 12/2022 | Zhang | G06Q 30/0202 |
| 11,631,102 B2 * | 4/2023 | Le | G06Q 10/067 |
| | | | 705/7.31 |
| 11,797,891 B1 * | 10/2023 | Musiboyina | G06N 3/006 |
| 12,067,588 B2 * | 8/2024 | Mead | G06Q 30/0633 |
| 12,361,442 B2 * | 7/2025 | Shukla | G06Q 10/06315 |
| 2003/0229502 A1 * | 12/2003 | Woo | G06Q 30/06 |
| | | | 705/400 |
| 2013/0073341 A1 * | 3/2013 | Vakhutinsky | G06Q 10/087 |
| | | | 705/7.35 |
| 2014/0200964 A1 * | 7/2014 | Hassanzadeh | G06Q 30/0283 |
| | | | 705/7.35 |
| 2016/0132916 A1 * | 5/2016 | Rosenberg | G06Q 30/0206 |
| | | | 705/7.31 |
| 2017/0200104 A1 * | 7/2017 | Kannan | G06Q 30/0283 |
| 2019/0114656 A1 * | 4/2019 | Zhang | G06Q 30/0202 |
| 2019/0172082 A1 * | 6/2019 | Ganti Mahapatruni | G06N 5/01 |
| 2020/0126016 A1 * | 4/2020 | Kannan | G06Q 30/0201 |
| 2020/0175533 A1 | 6/2020 | Moore et al. | |
| 2021/0304243 A1 * | 9/2021 | Le | G06Q 30/0205 |
| 2022/0198598 A1 * | 6/2022 | Li | G06N 5/04 |
| 2022/0284463 A1 * | 9/2022 | Mead | G06Q 30/0222 |
| 2022/0335460 A1 * | 10/2022 | Solotaroff | G06Q 30/0211 |
| 2023/0394512 A1 * | 12/2023 | Kumar | G06N 3/0442 |
| 2024/0185282 A1 * | 6/2024 | Kumar | G06Q 10/087 |
| 2024/0330968 A1 * | 10/2024 | Laserson | G06Q 30/0206 |
| 2024/0338721 A1 * | 10/2024 | Zhang | G06Q 30/0283 |
| 2025/0165999 A1 * | 5/2025 | Sethuraman | G06N 3/08 |

OTHER PUBLICATIONS

Hua, Junhao et al., Markdowns in E-Commerce Fresh Retail: A Counterfactual Prediction and Multi-Period Optimization Approach ACM, Knowledge Discovery and Datamining (KDD'21), Aug. 14-18, 2021 (Year: 2021).*

Prometheus: An End-to-End Machine Learning Framework for Optimization Markdown in Online Fashion E-Commerce ACM, Knowledge Discovery and Datamining (KDD'22), Aug. 14-18, 2022 (Year: 2022).*

Liu, Yi et al., A Map of Bandits for E-commerce ACM, Knowledge Discovery and Datamining (KDD'21), Aug. 16, 2021 (Year: 2021).*

Jia, Su et al., Dynamic Pricing with Monotonicity Constraint Under Unknown Parametric Demand Model 36th Conference on Neural Information Processing Systems (NeurIPS 2022) (Year: 2022).*

Misra, Kanishka et al., Dynamic Online Pricing with Incomplete Information Using Multiarmed Bandit Experiments Marketing Science, vol. 38, No. 2, Mar.-Apr. 2019 (Year: 2019).*

Cohen, Maxime C. et al., Feature-Based Dynamic Pricing SSRN http://dx.doi.org/10.2139/ssrn.2737045, Feb. 29, 2016 (Year: 2016).*

Den Boer, Arnoud V., Dynamic pricing and learning: Historical origins, current research, and new directions Surveys in Operations Research and Management Science 20 (2015) (Year: 2015).*

Xu, Jianyu et al., Towards Agnostic Feature-based Dynamic Pricing: Linear Policies vs Linear Valuation with Unknown Noise Proceedings of the 25th International Conference on Artificial Intelligence and Statistics (AISTATS) 2022 (Year: 2022).*

Tang, Wei et al., Differentially Private Contextual Dynamic Pricing AAMAS '20: Proceedings of the 19th International Conference on Autonomous Agents and MultiAgent Systems (Year: 2020).*

Hua, Junhao et al., Markdowns in E-Commerce Fresh Retail: A Counterfactual Prediction and Multi-Period Optimization Approach ACM, May 19, 2021 (Year: 2021).*

Kappor, Sanyam et al., A Simple and Fast Baseline for Tuning Large XGBoost Models arXiv, Nov. 12, 2021 (Year: 2021).*

Akande, Yetunde Faith et al, Application of Xgboost Algorithm for Sales Forecasting Using Walmart Dataset Advances in Electrical and Computer Technologies. Lecture Notes in Electrical Engineering, vol. 881, 2022 (Year: 2022).*

Hua, Junhao et al., "Markdowns in E-Commerce Fresh Retail: A Counterfactual Prediction and Multi-Period Optimization Approach", Date: 2021, Publisher: Association for Computing Machinery Link: https://arxiv.org/abs/2105.08313.

Caro, Felipe et al., "Coordination of Inventory Distribution and Price Markdowns for Clearance Sales at Zara", Date: 2020l, Link: http://personal.anderson.ucla.edu/felipe.caro/papers/pdf_FC29.pdf.

* cited by examiner

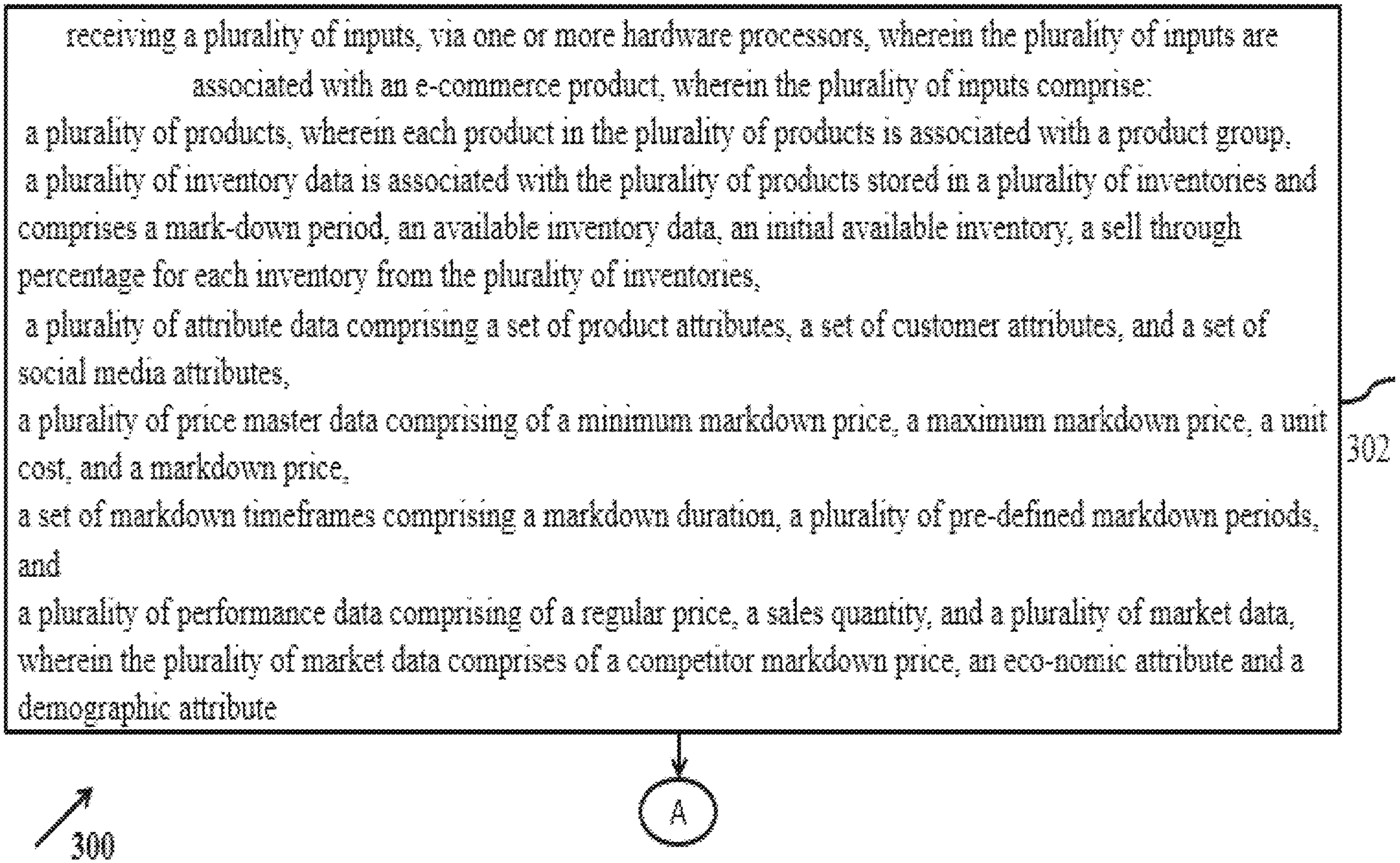

FIG. 3A

302 receiving a plurality of inputs, via one or more hardware processors, wherein the plurality of inputs are
associated with an e-commerce product, wherein the plurality of inputs comprise:

a plurality of products, wherein each product in the plurality of products is associated with a product group;

a plurality of inventory data is associated with the plurality of products stored in a plurality of inventories and
comprises a mark-down period, an available inventory data, an initial available inventory, a sell through
percentage for each inventory from the plurality of inventories;

a plurality of attribute data comprising a set of product attributes, a set of customer attributes, and a set of
social media attributes;

a plurality of price master data comprising of a minimum markdown price, a maximum markdown price, a unit
cost, and a markdown price;

a set of markdown timeframes comprising a markdown duration, a plurality of pre-defined markdown periods;
and a plurality of performance data comprising of a regular price, a sales quantity, and a plurality of market data,
wherein the plurality of market data comprises of a competitor markdown price, an eco-nomic attribute and a
demographic attribute

A

300

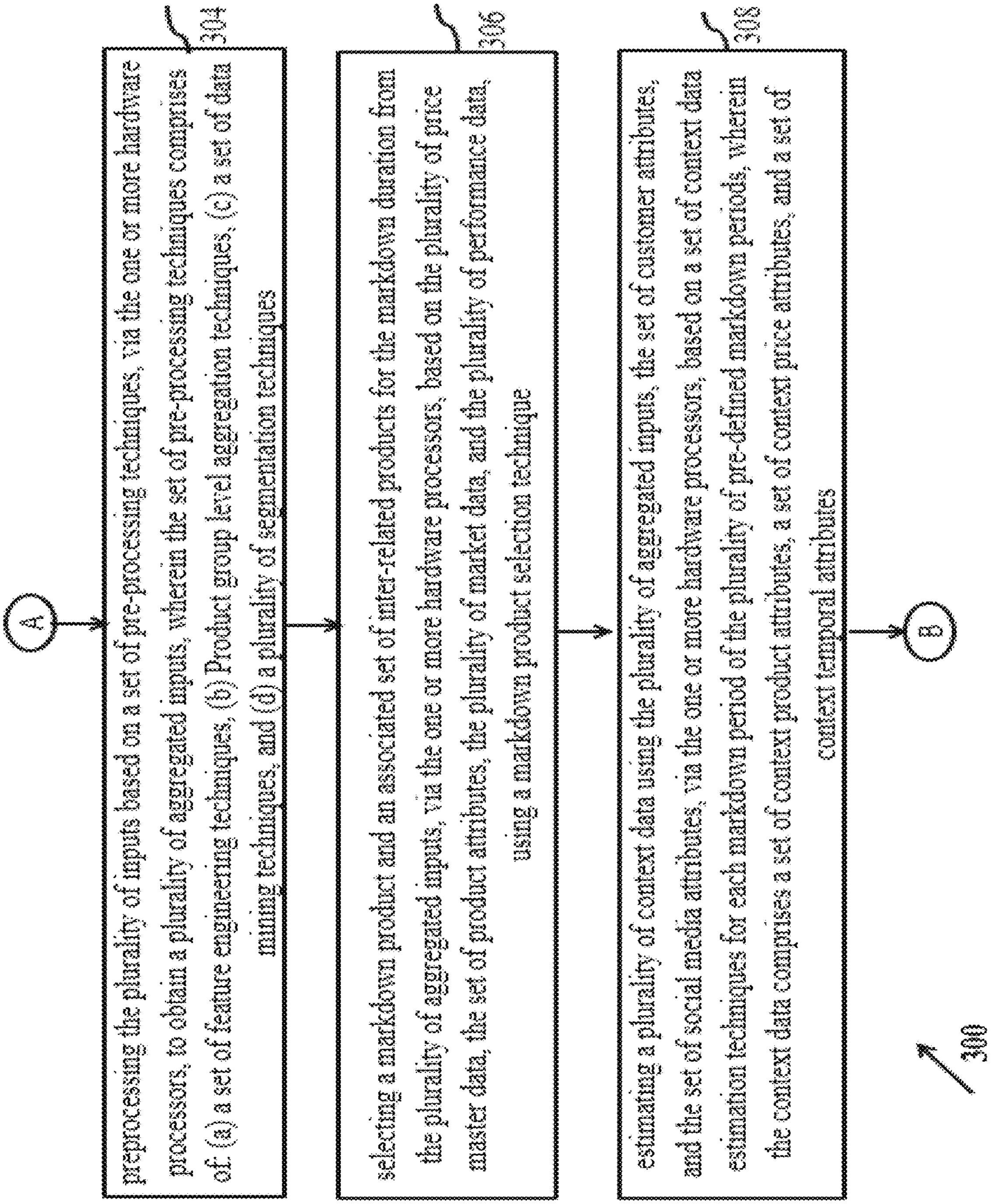

FIG. 3B preprocessing the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques

304 selecting a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique

306 estimating a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes

308

300 estimating a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate

310 optimizing the markdown price in real-time for the markdown product and the associated set of inter-related products during each markdown period of the plurality of pre-defined markdown periods based on a contextual bandits based online markdown pricing (OMP), via the one or more hardware processors, using the plurality of context data, the reward and the plurality of action arms, wherein the markdown price is optimized to maximize a cumulative reward based on a set of constraints and a continuous feedback from the plurality of input

312

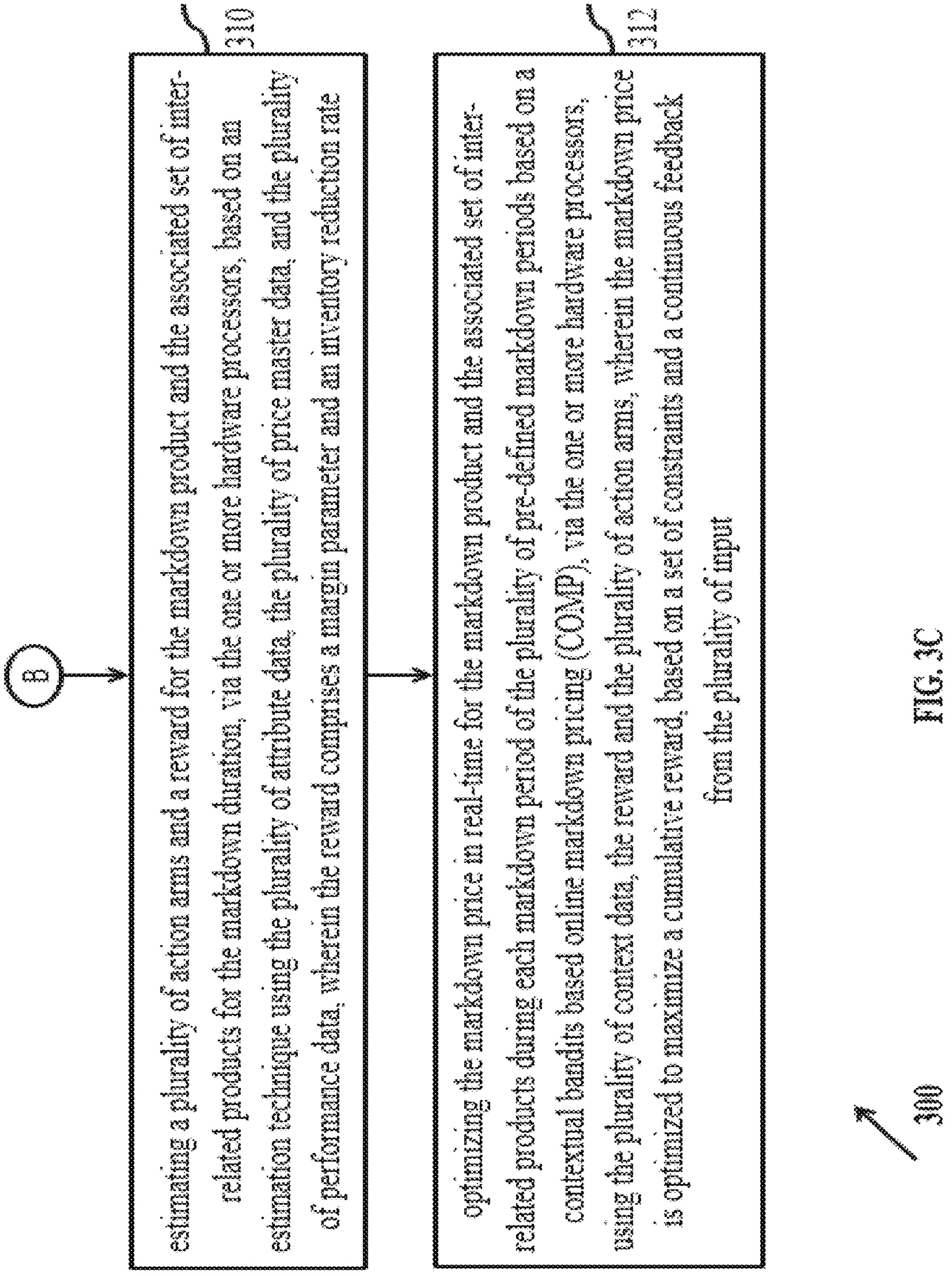

METHOD AND A SYSTEM FOR OPTIMIZING E-COMMERCE MARKDOWN PRICE BASED ON CONTEXTUAL BANDIT TECHNIQUE

PRIORITY CLAIM

This U.S. patent application claims priority under 35 U.S.C. § 119 to: Indian patent application Ser. No. 20/2321047614, filed on Jul. 14, 2023. The entire contents of the aforementioned application are incorporated herein by reference.

TECHNICAL FIELD

The disclosure herein generally relates to optimizing markdown price and, more particularly, to a method and a system for optimizing E-commerce markdown price based on contextual bandit technique.

BACKGROUND

E-commerce and retail industries employ several strategies to boost business and profitability, of which markdown pricing is a common pricing strategy. Markdown pricing involves reducing the price of a product to clear out stock from inventories. However, it is essential to plan a markdown strategy as part of the product lifecycle as it can adversely affect profit. The objective of markdown pricing is to price the products optimally in the markdown period so as to increase sales and margin while reducing unsold inventory.

The online markdown pricing problem is particularly challenging due to the high variability in demand. Further, factors such as the time-varying seasonality indices, presence of active competitors, evolving customer preferences and corresponding valuations, effect of inter-related items on demand and limited availability of data pertaining to new items, and learning from partial feedback unfolded into additional challenges.

Contextual bandit (CB) is a type of reinforcement learning algorithm for optimizing decisions in situations having a trade-off between exploration-exploitation and are used widely in various applications such as online advertising, recommendation systems and retail pricing. Contextual bandit enables to make decisions that lead to best outcomes for the markdown period.

The state-of-art CB based techniques used to optimize the markdown price are designed to either clear off maximum inventory by a certain exit date due to their limited shelf life or to maximize revenue. Further the existing techniques do not explicitly consider contextual features, wherein the contextual features consist of features that vary with time. Hence there is a requirement for a technique that simultaneously optimizes markdown prices in both the inventory and the margin for multiple periods while also considering the time varying contextual features and the price monotone, inventory constraints.

SUMMARY

Embodiments of the present disclosure present technological improvements as solutions to one or more of the above-mentioned technical problems recognized by the inventors in conventional systems. For example, in one embodiment, a method for optimizing E-commerce markdown price based on contextual bandit technique is provided.

The system includes a memory storing instructions, one or more communication interfaces, and one or more hardware processors coupled to the memory via the one or more communication interfaces, wherein the one or more hardware processors are configured by the instructions to receive a plurality of inputs, via one or more hardware processors, wherein the plurality of inputs are associated with an e-commerce product, wherein the plurality of inputs comprise: a plurality of products, wherein each product in the plurality of products is associated with a product group; a plurality of inventory data associated with the plurality of products stored in a plurality of inventories, wherein the plurality of inventory data comprises a markdown period, an available inventory data, an initial available inventory, and a sell through percentage for each inventory from the plurality of inventories; a plurality of attribute data comprising a set of product attributes, a set of customer attributes, and a set of social media attributes; a plurality of price master data comprising of a minimum markdown price, a maximum markdown price, a unit cost, and a markdown price; a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute. The system is further configured to preprocess the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques. The system is further configured to select a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique. The system is further configured to estimate a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes. The system is further configured to estimate a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate. The system is further configured to optimize the markdown price in real-time for the markdown product and the associated set of inter-related products during each markdown period of the plurality of pre-defined markdown periods based on a contextual bandit based online markdown pricing (COMP), via the one or more hardware processors, using the plurality of context data, the reward and the plurality of action arms, wherein the markdown price is optimized to maximize a cumulative reward, based on a set of constraints and a continuous feedback from the plurality of input In another aspect, a method for optimizing E-commerce markdown price based on contextual bandit technique is provided. The method includes receiving a plurality of inputs, via one or more hardware processors, wherein the plurality of inputs are associated with an e-commerce product, wherein the plurality of inputs comprise: a plurality of products, wherein each product in the plurality of products is associated with a product group; a plurality of inventory data associated with the plurality of products stored in a plurality of inventories, wherein the plurality of inventory data comprises a markdown period, an available inventory data, an initial available inventory, and a sell through percentage for each inventory from the plurality of inventories; a plurality of attribute data comprising a set of product attributes, a set of customer attributes, and a set of social media attributes; a plurality of price master data comprising of a minimum markdown price, a maximum markdown price, a unit cost, and a markdown price; a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute. The method further includes preprocessing the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques. The method further includes selecting a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique. The method further includes estimating a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes. The method further includes estimating a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate. The method further includes optimizing the markdown price in real-time for the markdown product and the associated set of inter-related products during each markdown period of the plurality of pre-defined markdown periods based on a contextual bandit based online markdown pricing (COMP), via the one or more hardware processors, using the plurality of context data, the reward and the plurality of action arms, wherein the markdown price is optimized to maximize a cumulative reward, based on a set of constraints and a continuous feedback from the plurality of input.

In yet another aspect, a non-transitory computer readable medium for optimizing E-commerce markdown price based on contextual bandit technique is provided. The method includes receiving a plurality of inputs, via one or more hardware processors, wherein the plurality of inputs are associated with an e-commerce product, wherein the plurality of inputs comprise: a plurality of products, wherein each product in the plurality of products is associated with a product group; a plurality of inventory data associated with the plurality of products stored in a plurality of inventories, wherein the plurality of inventory data comprises a markdown period, an available inventory data, an initial available inventory, and a sell through percentage for each inventory from the plurality of inventories; a plurality of attribute data comprising a set of product attributes, a set of customer attributes, and a set of social media attributes; a plurality of price master data comprising of a minimum markdown price, a maximum markdown price, a unit cost, and a markdown price; a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute. The method further includes preprocessing the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques. The method further includes selecting a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique. The method further includes estimating a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes. The method further includes estimating a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate. The method further includes optimizing the markdown price in real-time for the markdown product and the associated set of inter-related products during each markdown period of the plurality of pre-defined markdown periods based on a contextual bandit based online markdown pricing (COMP), via the one or more hardware processors, using the plurality of context data, the reward and the plurality of action arms, wherein the markdown price is optimized to maximize a cumulative reward, based on a set of constraints and a continuous feedback from the plurality of input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A-3C is a flow diagram illustrating a method (300) for optimizing E-commerce markdown price based on contextual bandit technique in accordance with some embodiments of the present disclosure.

DETAILED DESCRIPTION

Figure 1:
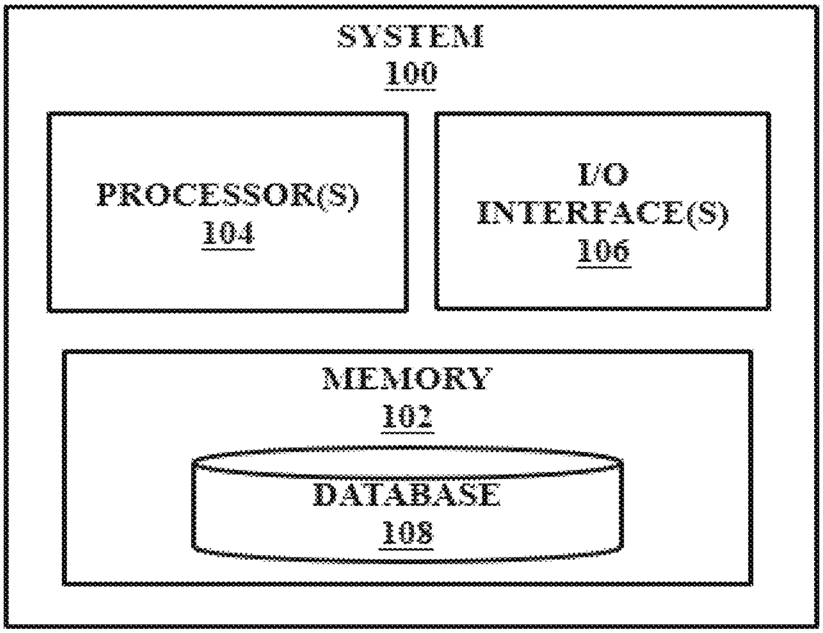
FIG. 1 illustrates an exemplary system for optimizing E-commerce markdown price based on contextual bandit technique according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 is an exemplary block diagram of a system 100 for optimizing E-commerce markdown price based on contextual bandit technique in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding historic E-commerce markdown prices and regarding contextual bandit techniques. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
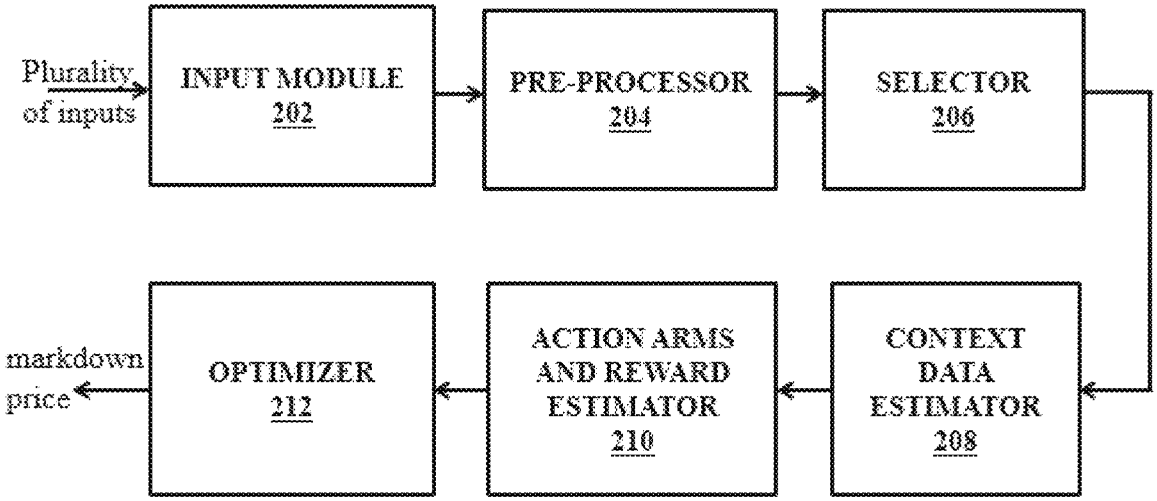
FIG. 2 is a functional block diagram for optimizing E-commerce markdown price based on contextual bandit technique according to some embodiments of the present disclosure.

Functions of the components of system 100 are explained in conjunction with functional overview of the system 100 in FIG. 2 and flow diagram of FIGS. 3A and FIG. 3C for optimizing E-commerce markdown price based on contextual bandit technique.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes optimizing E-commerce markdown price based on contextual bandit technique.

As depicted in FIG. 2, the functional system 200 of the system 100 is configured for optimizing E-commerce markdown price based on contextual bandit technique. The system 200 comprises an input module 202 configured for receiving a plurality of inputs, wherein the plurality of inputs are associated with an e-commerce product, wherein the plurality of inputs comprise: a plurality of products, wherein each product in the plurality of products is associated with a product group, a plurality of inventory data is associated with the plurality of products stored in a plurality of inventories and comprises a mark-down period, an available inventory data, an initial available inventory, a sell through percentage for each inventory from the plurality of inventories, a plurality of attribute data comprising a set of product attributes, a set of customer attributes, and a set of social media attributes, a plurality of price master data comprising of a minimum markdown price, a maximum markdown price, a unit cost, and a markdown price, a set of markdown timeframes comprising a markdown duration, a plurality of pre-defined markdown periods, and a plurality of performance data comprising of a regular price, a sales quantity, and a plurality of market data, wherein the plurality of market data comprises of a competitor markdown price, an eco-nomic attribute and a demographic attribute. The system 200 further comprises a pre-processor 204 configured to preprocess the plurality of inputs based on a set of pre-processing techniques, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques. The system 200 further comprises a selector 206 configured to select a markdown product and a corresponding set of inter-related products for the markdown duration from the plurality of aggregated inputs, based on the plurality of price master data, the set of product attributes, the plurality of market data and the plurality of performance data using a markdown product selection technique. The system 200 further comprises a context data estimator 208 configured to estimate a plurality of context data using the plurality of aggregated inputs, the set of customer attributes and the set of social media attributes, via the one or more hardware processors 104, based on a set of context data estimation techniques for each markdown period of the plurality of pre-defined markdown periods, wherein the context data comprises a set of context product attributes, a set of context price attributes, and a set of context temporal attributes. The system 200 further comprises an action arms and reward estimator 210 configured to estimate a plurality of action arms and a reward for the markdown product and the corresponding set of inter-related products for the markdown duration based on an estimation technique using the plurality of attribute data, the plurality of price master data and the plurality of performance data, wherein the reward comprises a margin parameter and an inventory reduction rate. The system 200 further comprises an optimizer 212 configured to optimize the markdown price in real-time for the markdown product and the corresponding set of inter-related products during each markdown period of the plurality of pre-defined markdown periods based on a contextual bandit based online markdown pricing (COMP), via the one or more hardware processors 104, using the plurality of context data, the reward and the plurality of action arms, wherein the markdown price is optimized to maximize a cumulative reward, based on a set of constraints and continuous feedback from the plurality of input.

The various modules of the system 100 and the functional blocks in FIG. 2 are configured for optimizing E-commerce markdown price based on contextual bandit technique are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3C. The FIGS. 3A-3C with reference to FIG. 1, is an exemplary flow diagram illustrating a method 300 for optimizing E-commerce markdown price based on contextual bandit technique using the system 100 of FIG. 1 according to an embodiment of the present disclosure.

The steps of the method of the present disclosure will now be explained with reference to the components of the system 100 of FIG. 1 for optimizing E-commerce markdown price based on contextual bandit technique and the modules 202-212 as depicted in FIG. 2 and the flow diagrams as depicted in FIGS. 3A-3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs is received in the input module 302. The plurality of inputs are associated with an e-commerce product, wherein the plurality of inputs comprise:

a plurality of products, wherein each product in the plurality of products is associated with a product group, a plurality of inventory data is associated with the plurality of products stored in a plurality of inventories and comprises a markdown period, an available inventory data, an initial available inventory, a sell through percentage—for each inventory from the plurality of inventories, a plurality of attribute data comprising a set of product attributes, a set of customer attributes, and a set of social media attributes, a plurality of price master data comprising of a minimum markdown price, a maximum markdown price, a unit cost, and a markdown price, a set of markdown timeframes comprising a markdown duration, a plurality of pre-defined markdown periods, and a plurality of performance data comprising of a regular price, a sales quantity, and a plurality of market data, wherein the plurality of market data comprises of a competitor markdown price, an economic attribute and a demographic attribute.

The set of social media attributes comprises keywords used for search and a set of words used in hashtags in social media posts liked by the customer across different social media platforms.

The plurality of performance data comprising of a regular price, a sales quantity, and a plurality of market data, wherein the plurality of market data comprises of a competitor markdown price, an economic attribute—a seasonality indices, a sales rate, a tax rates, a GDP, an inflation, an interest rates and a demographic attribute—an income level, an education level, and a race/nationality.

At step 304 of the method 300, the plurality of inputs are preprocessed in the pre-processor 204. The plurality of inputs are pre-processed based on a set of pre-processing techniques to obtain a plurality of aggregated input. The set of pre-processing techniques comprises of:

(a) a set of feature engineering techniques, (b) Product group level aggregation techniques, (c) a set of data mining techniques, and (d) a plurality of segmentation techniques In an embodiment, the feature engineering technique comprises of a plurality of techniques to perform data cleaning—imputation of missing values, outlier removal, etc., data integration—merging data, removing conflicts, etc., a set of parameters selection techniques, and data transformation, generalization, normalization, aggregation.

In an example scenario the feature engineering technique comprises data cleaning techniques including imputation of missing values, outlier removal, and a set of data integration techniques including merging data, removing conflicts and a set of parameters selection techniques, and a data transformation, a generalization, a normalization and a aggregation techniques.

In an embodiment, the product group level aggregation technique is performed for a product group at a pre-define level using a set of statistical techniques.

In an example scenario the product group level aggregation technique is performed for each product group at markdown period level, where the sum of sales quantity and the average of prices for the products in the product group are considered, In an embodiment, the set of data mining techniques to is used to identify a plurality of related products in the plurality of products.

In an example scenario the set of data mining techniques comprises a set of data mining techniques such as market basket analysis and distance measure of probability distributions such as KL divergence.

In an embodiment, the plurality of segmentation techniques are used to obtain set of contextual features using the set of customer attributes.

In an example scenario the plurality of segmentation techniques comprises a set of unsupervised segmentation techniques like K-means clustering to obtain set of contextual features using the set of customer attributes.

At step 306 of the method 300, a markdown product and a corresponding set of inter-related products is selected in the selector 206. The markdown product and a corresponding set of inter-related products is selected for the markdown duration from the plurality of aggregated inputs. The markdown product and the corresponding set of inter-related products is selected based on the plurality of price master data, the set of product attributes, the plurality of market data and the plurality of performance data using a markdown product selection technique.

In an embodiment, the markdown product is selected based on the markdown product selection technique which includes computing a product eligibility score, wherein the product eligibility score is a function of the available inventory data, the set of product attributes and the plurality of performance data.

The product eligibility score is a function of the available inventory data, the set of product attributes and the plurality of performance data and is computed as shown below:

$$PES = \frac{\text{available inventory}}{(\text{markdown duration} - \text{product age}) * \text{sales\_rate}} \quad (1)$$

At step 308 of the method 300, a plurality of context data is estimated in the context data estimator 208. The plurality of context data is estimated using the plurality of aggregated inputs, the set of customer attributes, and the set of social media attributes based on a set of context data estimation techniques for each markdown period of the plurality of pre-defined markdown periods. The context data comprises:

a) a set of context product attributes, b) a set of context price attributes, and c) a set of context temporal attributes In an embodiment, the plurality of context data is estimated using the plurality of aggregated inputs based on a set of context data estimation techniques. The set of context data estimation techniques comprises:

a) the set of context temporal attributes are estimated based on a Gradient boosting technique.

b) the set of context price attributes are estimated based on a machine learning techniques; and c) the set of context product attributes are estimated based on a set of data mining techniques.

In an embodiment, a context features consist of vectors of length equivalent to the markdown duration for:

a product attribute: The Product attributes further includes a color, a pattern, a material, a gender category, a launch date, a product age and a sub-category a price attributes: The price attributes include a regular price, a unit cost, a initial markdown price, a price elasticity, a prices of interrelated items, a markdown prices, and a previous period's price a temporal attribute: Temporal attributes include a seasonality indices, an inventory level, a sales rate, a competitor prices and a period-level in-season sales forecast for markdown period a customer attributes: customer attributes include age, city, income level, customer loyalty, and shopping frequency.

The set of context temporal attributes is estimated based on a XGBoost model, which can handle non-linear dependencies and scales efficiently with large datasets.

The below expression explains the markdown demand of an item 'i' at time 't', as determined by the XGBoost model:

$$d_{i,t} = f(MPE_{i,t}, RSR_i, MWN_i, IL_{i,t}, SI_{i,t}, \text{attribute}_i, RP_i, nholiday_t) \quad (2)$$

where, $MPE_{i,t}$ is the markdown price estimate for the article 'i' at time 't'. This is obtained from the initial markdown price estimation module.

$RSR_i$: regular period sales rate of the article 'i'.

$MWN_i$: Markdown period number of the article 'i'. This is the number of periods since markdown started.

$SI_{i,t}$: Seasonality indices of the article 'i' at time 't'

$attribute_i$: Attributes corresponding to article 'i'

$IL_{i,t}$: Inventory left for the article 'i' at time 't'.

$RP_i$: Regular period price for article 'i'.

$nholiday_t$: Represents the number of holidays from time step 't−1' to time step't'.

The above expression considers factors such as attribute values, regular period sales and price, markdown period number, and remaining inventory as independent variables. This allows the model to learn how the remaining inventory influences demand as the markdown progresses. Further a sensitivity analysis conducted to determine which contextual factors have the strongest influence on optimal markdowns for different products. The bandits model is tuned for sensitivity to hyperparameters like learning rates, epsilon values, and sample sizes.

The set of context price attributes: This initial price prediction forms the base price for subsequent processes like demand forecasting and elasticity estimation. A K-Nearest Neighbors (KNN) regressor is employed to estimate initial markdown prices. The KNN regressor uses item attributes, regular retail price, temporal features, and sales rate to determine similarity. This method proves to be highly effective due to the large number of data samples and low data dimensionality. Further a SPECTS model is used to ascertain the price elasticity of products by adaptively learning through Thompson Sampling.

The set of context product attributes: The set of context product attributes are estimated based on a set of data mining techniques. Product attributes are estimated for the product group level using data mining techniques such as data clustering, particularly hierarchical clustering, where data points are a single cluster, which are grouped based on similarities in attributes. These newly created clusters can then be analyzed separately from each other. Input is product attribute data and output are the context product attributes.

At step 310 of the method 300, a plurality of action arms and a reward is estimated for the markdown product and the corresponding set of inter-related products for the markdown duration in the action arms and reward estimator 210. The plurality of action arms and the reward is estimated based on an estimation technique using the plurality of attribute data, the plurality of price master data and the plurality of performance data. The reward comprises: (a) a margin parameter and (b) an inventory reduction rate.

In an embodiment, the plurality of action arms and the reward is estimated based on the estimation techniques.

The plurality of action arms are a set of discrete price points within the minimum markdown price and the maximum markdown price. The consists of vectors of length equivalent to the markdown duration of discrete price points within minimum, maximum markdown price range.

The reward is a weighted sum of the margin parameter and the inventory reduction rate:

a) the margin parameter (Margin) is computed based on the sales quantity, the unit cost, and a markdown price, b) the inventory reduction rate (IRR) is computed based on the available inventory data and the sales quantity, and The weights can be adjusted according to retailer requirements and satisfies a plurality of combinations of margin and inventory reduction rate.

$$\text{reward} = \alpha_1 * \text{Margin}_i[t, w] + \alpha_2 * IRR_i[t, w] \tag{3}$$

where, $i \in$ products, $t \in$ rounds, $w \in$ markdown periods, $\text{Margin}_i[t,w]$ is the margin for the round t, for the period w, for the product i $IRR_i[t,w]$ is the Inventory Reduction Rate for the round t, for the period w, for the product i, The margin parameter is the profit given by difference of revenue through sales and the cost.

$$\text{Margin}_i[t, w] = \sum_{w=1}^{T} (S_{new,i}[t, w] * (P_{opt,i}[t, w] - cp_i)) \tag{4}$$

where, $i \in$ product group, $t \in$ rounds, $w \in$ markdown periods, $P_{opt,i}[t,w]$ is the optimal price for the round t, in period w, for the product group i, $cp_i$ is the unit cost price of the product group i, $S_{new,i}[t,w]$ is the sales corresponding to optimal price for the round t, in period w, for the product group i, considering inter-item and competitor effects, and $\text{Margin}_i[t,w]$ is the profit margin for the round t, for the period w, for the product group i.

IRR is defined as ratio of difference between initial inventory and final inventory in round 't' and total initial inventory and is expressed as shown below:

$$IRR_i[t, w] = \sum_{w=1}^{T} \frac{(I_{init,i}[t, w] - I_{fin,i}[t, w])}{I_{o,i}} = \frac{S_{new,i}[t, w]}{I_{o,i}} \tag{5}$$

where, $i \in$ product group, $t \in$ rounds, $w \in$ markdown periods, $I_{init,i}[t,w]$ is the initial inventory at round t, for the period w, for the product group i, $I_{fin,i}[t,w]$ is the final inventory at round t, for the period w, for the product group i, $S_{new,i}[t,w]$ is the sales corresponding to optimal price for the round t, in period w, for the product group i, considering inter-item and competitor effects, $I_{0,i}$ is the total initial inventory for the product group i, $IRR_i[t,w]$ is the Inventory Reduction Rate for the round t, for the period w, for the product group i, The cumulative reward is a summation of the margin parameters and the inventory reduction rates for all the markdown periods of the markdown duration. The cumulative reward for each period is the sum of weighted combination of margin and inventory reduction rate based on actuals or forecasts summed across all periods in the markdown duration and is expressed as shown below:

$$\sum_{w=1}^{T} \alpha_1 * \text{Margin}_i[t, w] + \alpha_2 * IRR_i[t, w] \tag{6}$$

Where, $i \in$ product group, $j \in$ inter-related product groups, $t \in$ rounds, $w \in$ markdown periods, T is the total markdown duration, $IRR_i[t,w]$ is the Inventory Reduction Rate for the round t, for the period w, for the product group i, $\text{Margin}_i[t,w]$ is the profit margin for the round t, for the period w, for the product group i, and $\alpha_1$, $\alpha_2$ are the weights for the Objective, i.e., margin and inventory reduction rate respectively, such that $\alpha_1+\alpha_2=1$ At step 312 of the method 300, the markdown price is optimized in real time in the optimizer 212 for the markdown product and the corresponding set of inter-related products during each markdown period of the plurality of pre-defined markdown periods.

The markdown price is optimized to maximize a cumulative reward, based on a set of constraints and continuous feedback from the plurality of input. The set of constraints comprises the minimum markdown price, the maximum markdown price, the plurality of competitor prices and the plurality of inventory data. The continuous feed is performed by utilizing previous round's chosen markdown price as maximum markdown price in current round. The remaining inventory is updated based on initial inventory and cumulative sum of sales quantity up to current round.

The set of constraints includes:

Markdown price constraints: non-increasing price $P_1>=P_2$ . . .

$$>= P_T P_{opt,i}[t, w] <= P_{opt,i}[t, w-1] \quad (7)$$

Sum of sales in each period does not exceed I_(0,i), where I_(0,i) is total inventory for the product group 'i', $$\sum_{w=1}^{T} S_{new,i}[t, w] \leq (I_{init,i} - I_{term,i}) \quad (8)$$

The prices are bound by minimum price and maximum markdown price for the product group.

$$P_{min,i} <= P_{opt,i}[t, w] <= P_{max,i}[w] \quad (9)$$

$$P_{max,i}[w] = P_{opt,i}[t, w-1]$$

where, $i \in$ product group, $t \in$ rounds, $w \in$ markdown periods, $P_{opt,i}[t,w]$ is the optimal price for the round t, in period w, for the product group i, $S_{new,i}[t,w]$ is the sales corresponding to optimal price for the round t, in period w, for the product group i, considering inter-item and competitor effects, $I_{init,i}[t,w]$ is the initial inventory at round t, for the period w, for the product group i, $I_{fin,i}[t,w]$ is the final inventory at round t, for the period w, for the product group i, and $P_{min,i}$, $P_{max,i}$ are min-max bounds for the markdown price of the product group i.

For each iteration, optimization is performed for all markdown periods together with forecasted values and actual performance data as the rounds progress. Continuous update from previous round actual sales performance is fed forward to subsequent rounds. The maximum markdown price is updated with previous round's markdown price as captured in table 1 below, wherein FC represents forecasted values and asterisk (*) represents the actual values:

TABLE 1

| Cumulative markdown pricing model | | | | | | |
|---|---|---|---|---|---|---|
| Round | Period 1 | Period 2 | Period 3 | Period 4 | Period 5 | Period 6 |
| 1 | FC | FC | FC | FC | FC | FC |
| 2 | * | FC | FC | FC | FC | FC |
| 3 | * | * | FC | FC | FC | FC |
| 4 | * | * | * | FC | FC | FC |
| 5 | * | * | * | * | FC | FC |
| 6 | * | * | * | * | * | FC |

The markdown price is optimized based on a contextual bandit based online markdown pricing (COMP), using the plurality of context data, the reward and the plurality of action arms. The COMP system can test multiple markdown amounts simultaneously on different products in an online setting. This allows the contextual bandits algorithm to learn the optimal markdown policy based on the results and feedback in real-time The COMP is an ensemble of a set of unsupervised reinforcement learning techniques for the markdown prices. The unsupervised reinforcement learning technique comprising at least one of a LinUCB technique, a mini-monster in Vowpal Wabbit (VW) technique, a Contextual Thompson Sampling (CTS) technique, and Bayes UCB technique. The contextual bandits algorithm incorporates ensemble techniques that combine the results of multiple bandits models to improve accuracy. This enables more robust optimization.

The unsupervised reinforcement learning technique are performed in several steps including selection of markdown products markdown while initializing the cumulative reward as 0. For each iteration and period, context vector of markdown duration length and sample action vector is noted for each period, based on the probabilities (no. of occurrence of action price/total no. of price points). Further a reward vector is computed for the selected actions using a demand model/history, where the margin is expressed as shown below:

$$\text{Margin}_i[t, w] = \sum_{w=1}^{T} (S_{new,i}[t, w] * (P_{opt,i}[t, w] - cp_i)) \quad (10)$$

$$IRR_i[t, w] = \sum_{w=1}^{T} \frac{(I_{init,i}[t, w] - I_{fin,i}[t, w])}{I_{o,i}} = \frac{S_{new,i}[t, w]}{I_{o,i}} \quad (11)$$

And the demand model is given by $$S_{new,i}[t, w] = S_{pred,i}[t, w] * \frac{\prod_j \left(\frac{P_{opt,j}[t, w]}{P_{init,j}}\right)^{-\gamma_{ij}}}{\exp\left(lr_i * \frac{P_{opt,i}[t, w] - P_{comp,i}[w]}{P_{comp,i}[w]}\right)} \quad (12)$$

Where, where, $i \in$ product group, $j \in$ inter-related product groups, $t \in$ rounds, $w \in$ markdown periods, $P_{init,i}$ is the initial markdown price forecast for the product group i, $S_{pred,i}[t,w]$ is the sales forecast for the price $P_{init}$ for the round t, in period w, for the product group i, $\gamma_{ij}$ is the cross-price elasticity between product group i and product group j, $P_{opt,i}[t,w]$ is the optimal price for the round t, in period w, for the product group i, $S_{new,i}$[t,w] is the sales corresponding to optimal price for the round t, in period w, for the product group i, considering inter-item and competitor effects, cpi is the unit cost price of the product group i, $I_{0,i}$ is the total initial inventory for the product group i, $\alpha_1$, $\alpha_2$ are the weights for the Objective, i.e., margin and inventory reduction rate respectively, such that $\alpha_1+\alpha_2=1$ $P_{min,i}$, $P_{max,i}$ are min-max bounds for the markdown price of the product group i, $I_{term,i}$ is the terminal inventory for the product group i, given as input T is the total markdown duration, Iri is the competitor coefficient for the product group i, $P_{comp,i}$[w] is the competitor price for the period w, for the product group i, IRRi[t,w] is the Inventory Reduction Rate for the round t, for the period w, for the product group i, $\text{Margin}_i$[t,w] is the profit margin for the round t, for the period w, for the product group i $I_{init,i}$[t,w] is the initial inventory at round t, for the period w, for the product group i, $I_{fin,i}$[t,w] is the final inventory at round t, for the period w, for the product group i, $\text{Sellthrough}_i$ % is the sell through percentage for the product group i.

The iterations are stopped when there is a change in cumulative rewards between successive periods is less than ftol, and optimal markdown price will be shared as the output.

The optimization of the markdown price in real-time includes generating a cross-price elasticity matrix. The cross-price elasticity matrix for the markdown duration is generated using a regression technique based on the plurality of price master data, the set of product attributes and the plurality of performance data and the cross-price elasticity matrix comprises a plurality of rows and a plurality of columns.

Optimization of the markdown price in real-time for the corresponding set of inter-related products is performed using all the plurality of rows and the plurality of columns of the cross-price elasticity matrix.

The diagonal of the cross-price elasticity matrix represents the cross-price elasticity of demand of the product with itself. It has the price elasticity coefficients of the product—the percentage change of the quantity demanded for a product to the percentage change in the price of the product. The non-diagonal elements of the cross-price elasticity matrix represents the cross-price elasticity between inter-related products.

Optimization of the markdown price in real-time for the markdown product is performed using a diagonal of the cross-price elasticity matrix.

In an embodiment. The optimization can be expressed as:

$$\text{Maximize}_{P_{opt,i}[t]} \sum_{w=1}^{T} \alpha_1 * \text{Margin}_i[t, w] + \alpha_2 * IRR_i[t, w] \quad (13)$$

$$\text{Margin}_i[t, w] = \sum_{w=1}^{T} (S_{new,i}[t, w] * (P_{opt,i}[t, w] - cp_i)) \quad (14)$$

$$IRR_i[t, w] = \sum_{w=1}^{T} \frac{(I_{init,i}[t, w] - I_{fin,i}[t, w])}{I_{o,i}} = \frac{S_{new,i}[t, w]}{I_{o,i}} \quad (15)$$

such that, $$P_{min,i} <= P_{opt,i}[t, w] <= P_{max,i}[w] \quad (16)$$

$$P_{max,i}[w] = P_{opt,i}[t, w-1] \quad (17)$$

-continued $$\sum_{w=1}^{T} S_{new,i}[t, w] <= (I_{init,i} - I_{term,i}) \quad (18)$$

$$\sum_{w=1}^{T} S_{new,i}[t, w] >= \text{Sellthrough}_i\%(I_{init,i} - I_{term,i}) \quad (19)$$

$$P_{opt,i}[t, w] <= P_{opt,i}[t, w-1] \quad (20)$$

$$S_{new,i}[t, w] = S_{pred,i}[t, w] * \frac{\prod_j \left(\frac{P_{opt,j}[t, w]}{P_{init,j}}\right)^{-\gamma_{ij}}}{\exp\left(lr_i * \frac{P_{opt,i}[t, w] - P_{comp,i}[w]}{P_{comp,i}[w]}\right)} \quad (21)$$

where, i∈product group, j∈inter-related product groups, t∈rounds, w∈markdown periods, $P_{init,i}$ is the initial markdown price forecast for the product group i, $S_{pred,i}$[t,w] is the sales forecast for the price $P_{init}$ for the round t, in period w, for the product group i, $\gamma_{ij}$ is the cross-price elasticity between product group i and product group j, $P_{opt,i}$[t,w] is the optimal price for the round t, in period w, for the product group i, $S_{new,i}$[t,w] is the sales corresponding to optimal price for the round t, in period w, for the product group i, considering inter-item and competitor effects, cpi is the unit cost price of the product group i, $I_{0,i}$ is the total initial inventory for the product group i, $\alpha_1$, $\alpha_2$ are the weights for the Objective, i.e., margin and inventory reduction rate respectively, such that $\alpha_1+\alpha_2=1$ $P_{min,i}$, $P_{max,i}$ are min-max bounds for the markdown price of the product group i, $I_{term,i}$ is the terminal inventory for the product group i, given as input T is the total markdown duration, Iri is the competitor coefficient for the product group i, $P_{comp,i}$[w] is the competitor price for the period w, for the product group i, IRRi[t,w] is the Inventory Reduction Rate for the round t, for the period w, for the product group i, $\text{Margin}_i$[t,w] is the profit margin for the round t, for the period w, for the product group i $I_{init,i}$[t,w] is the initial inventory at round t, for the period w, for the product group i, $I_{fin,i}$[t,w] is the final inventory at round t, for the period w, for the product group i, $\text{Sellthrough}_i$ % is the sell through percentage for the product group i.

EXPERIMENTS

Figure 4:
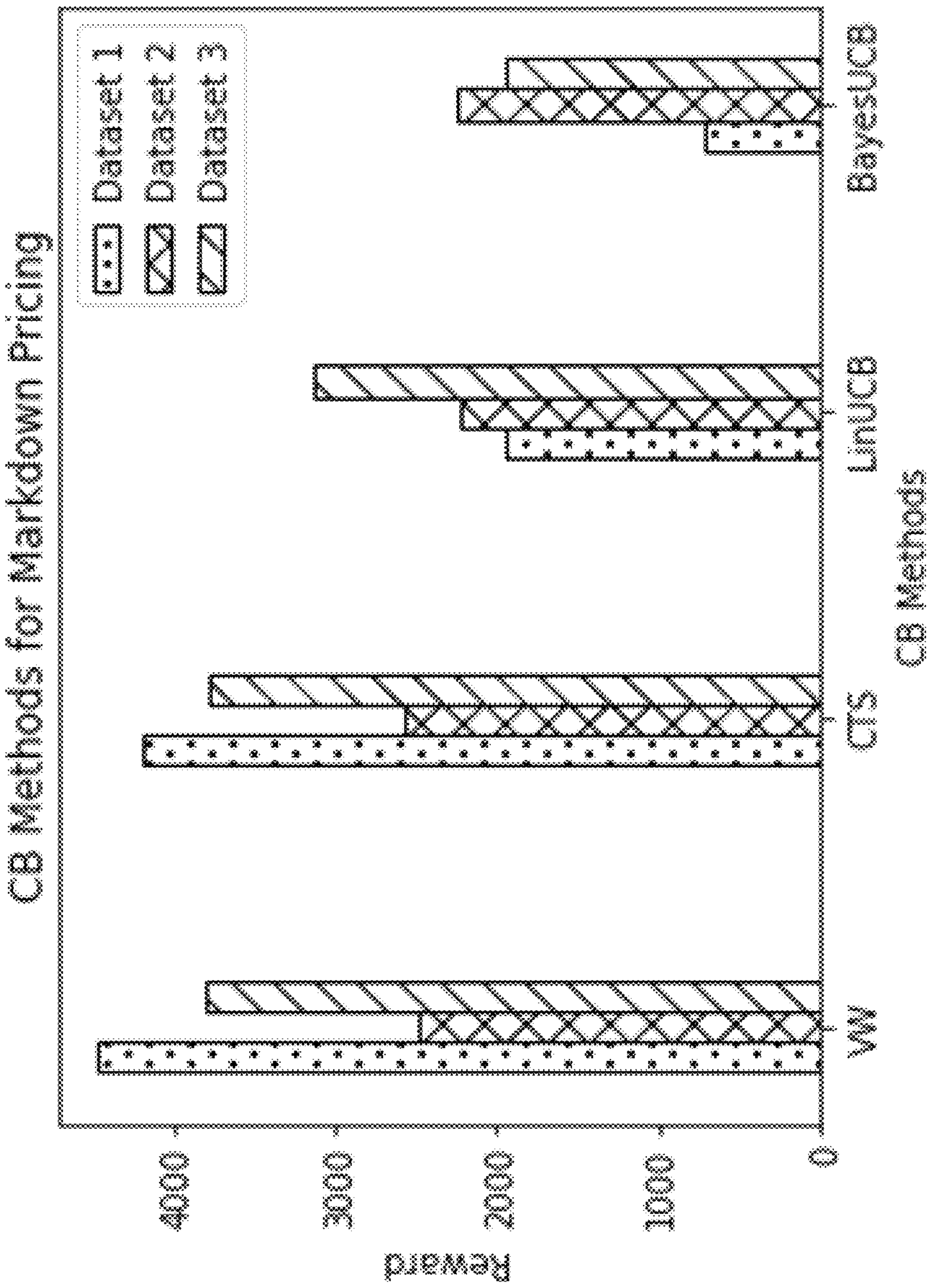
FIG. 4 is a graph illustrating a comparison of average rewards for different optimization methods for different datasets in accordance with some embodiments of the present disclosure.

An experiment has been set-up to understand the efficacy of various CB algorithms for online markdown optimization. The disclosed solution has been applied to three different datasets pertaining to e-commerce retail as shown in FIG. 4, wherein the comparison of average rewards for different optimization methods for different datasets is illustrated.

The optimal prices recommended by the disclosed COMP model led to significant reduction in inventory. The FIG. 4 further illustrates a comparison of rewards for different contextual bandits methods for the datasets considered in FIG. 4. From the FIG. 4, it is observed that VW performs well for datasets 1 and 3, CTS performs well for dataset2.

TABLE 2

| Performance evaluation of CB algorithms for different datasets | | | |
|---|---|---|---|
| Dataset | CB Technique | Sales Change % | Margin Change % |
| Dataset 1 | VW | 17.24 | 6.14 |
| Dataset 2 | CTS | 7.79 | 3.54 |
| Dataset 3 | VW | 12.20 | 8.18 |

Table 2 shows performance evaluation of CB algorithms for different datasets. For Dataset 1, VW method resulted in a 17.24%-sales units increase with a 6.14% improvement in margin from the actuals, considering sales gain. VW learns complex behavior for the context with Inverse Propensity Scoring and Projection and Smoothing of distribution of policies. CTS performs best for Dataset 2, resulting in 7.79% increase in sales units with 3.54% increase in margin from the actuals, considering sales gain. The CTS algorithm uses prior sales information from previous markdown and uses Thompson Sampling that alleviates the influence of delayed feedback by randomizing over actions. For Dataset 3, VW epsilon-greedy algorithm performed well resulting in 12.2% increase in sales units with 8.18% increase in margin, considering sales gain.

The oracle (the optimal pricing solution) is formed by taking argmax of reward objective. For every context, maximum reward for random actions through several iterations is obtained and stored as oracle. The accuracy of the oracle improves with the number of iterations used to determine oracle reward. Regret is the difference between the reward obtained from the optimal pricing solution (as determined by the oracle) and the reward obtained our pricing solution. The oracle is used to determine the optimal reward for each context, which is the maximum reward that can be obtained by any pricing solution for that context. The disclosed pricing solution is applied to calculate the reward obtained from it. The regret is calculated by subtracting the reward obtained from the specific pricing solution from the optimal reward for each context. The regret is averaged across all contexts to obtain the average regret for the disclosed techniques.

Solving Real-world Online Markdown Pricing Problems using the disclosed COMP techniques:

The disclosed COMP model is used to address practical challenges faced by an online retailer for markdown pricing. The bandits model is trained in a distributed fashion across multiple computational nodes to speed up the training process. This allows optimization at scale to effectively optimize markdown pricing for a very large number (potentially thousands) of different products. This enables real-world practical application. A Dataset 1 is used to illustrate the results corresponding to these use-cases.

Figure 5:
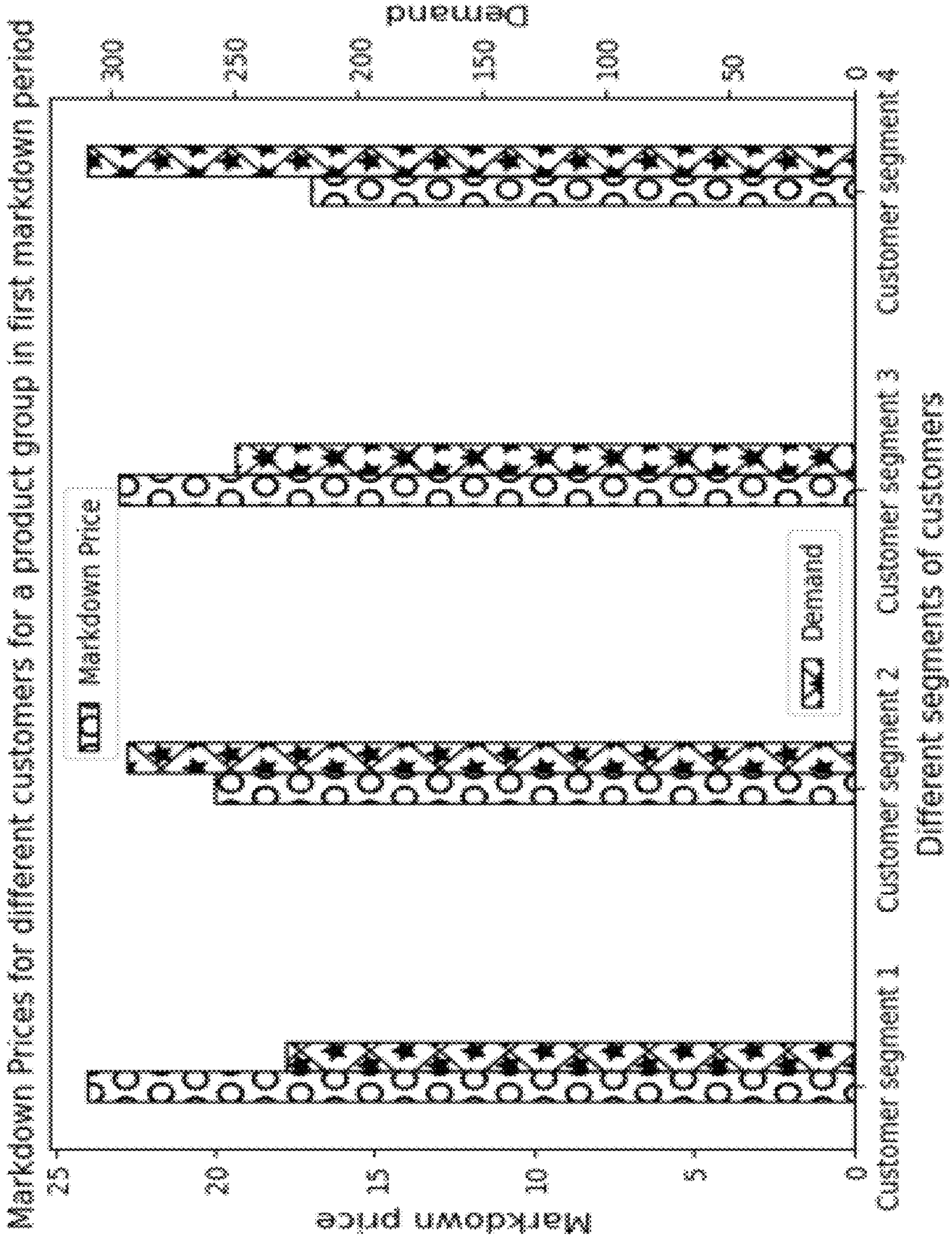
FIG. 5 illustrates personalized markdown prices for different customer groups for a product group in markdown in accordance with some embodiments of the present disclosure.
Figure 6:
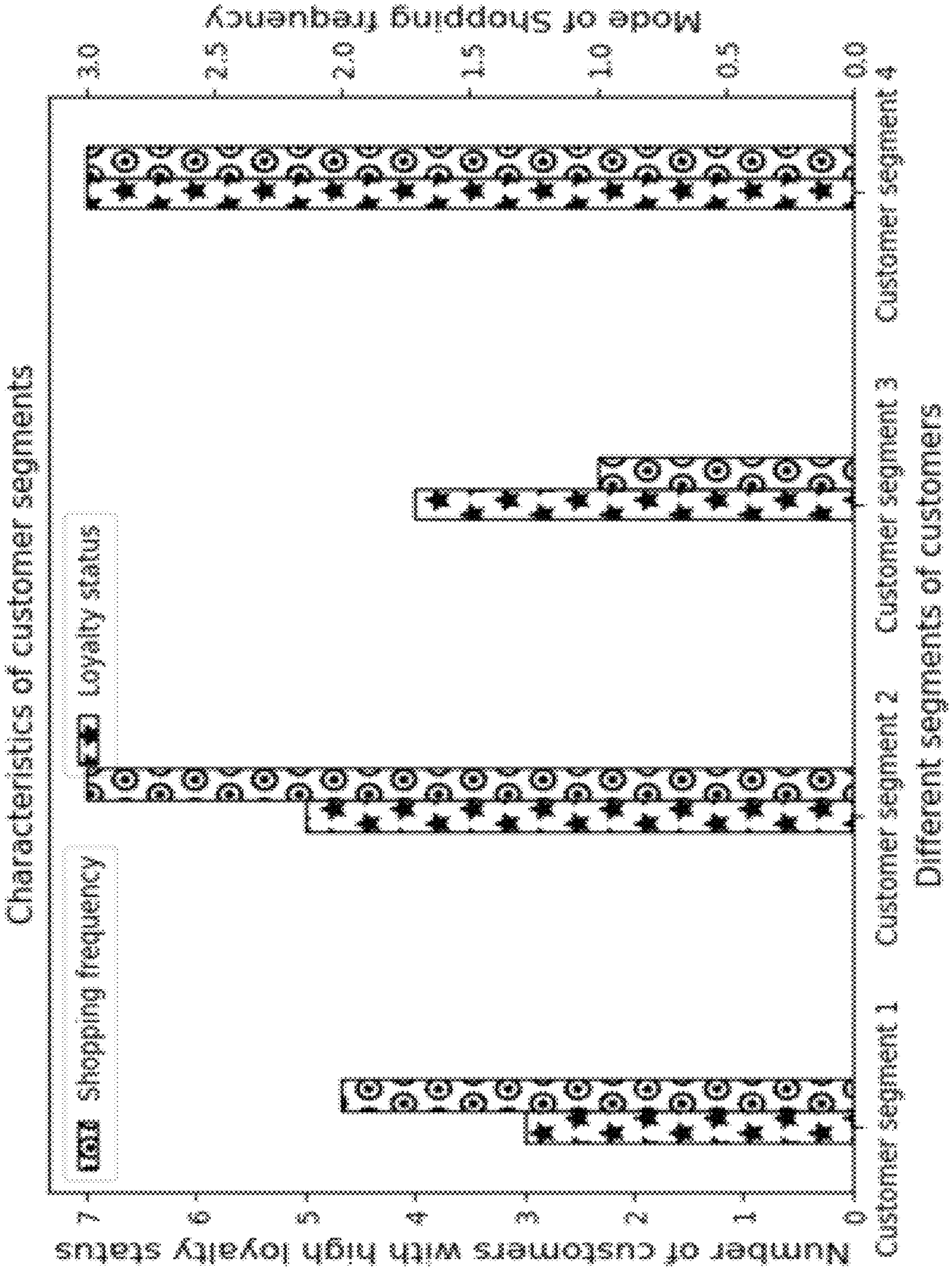
FIG. 6 illustrates characteristics of customer groups for the customers associated with a product group in accordance with some embodiments of the present disclosure.

Personalized markdown pricing for different customer groups. Personalizing markdown discounts is an interesting strategy followed by most retailers to proactively engage with their customer base to drive sales of products that are nearing the end of lifecycle. A variety of clustering algorithms are employed to group customers sharing similar buying patterns and attributes. The clustering algorithm grouped customers associated with a product group based on their age, income level, city, loyalty status and shopping frequency. The customer clusters obtained were added to the set of context features in COMP model. It is observed that different customer groups were prescribed different markdown discounts based on their loyalty status and shopping frequency. Also, each customer group responded differently to the price discounts offered. The FIG. 5 illustrates personalized markdown prices for different customer groups for a product group in markdown and the FIG. 6 illustrates characteristics of customer groups for the customers associated with a product group. The FIG. 5 shows the variations in markdown prices for different segments of customers for the same product group in a particular period in markdown. From FIG. 5 and FIG. 6, it is seen that the Customer segment 4 was offered the steepest markdown price for the product group chosen. This was because customer segment 4 had the largest number of customers with high customer loyalty and customers who make regular shopping frequency. Hence, the disclosed COMP model can personalize markdown discounts for different customer groups based on their distinguishing characteristics.

Markdown pricing in the presence of competitors: Responding to competitor markdowns is key to optimize margins in the markdown setting as competitor price reductions often attract strategic customers who tend to postpone purchases until the steepest discount is offered. In such a condition, the retailer encounters the challenge of optimizing discounts, as a response to competitor prices, to retain his customer base whilst maximizing margins corresponding to the remaining inventory.

Figure 7:
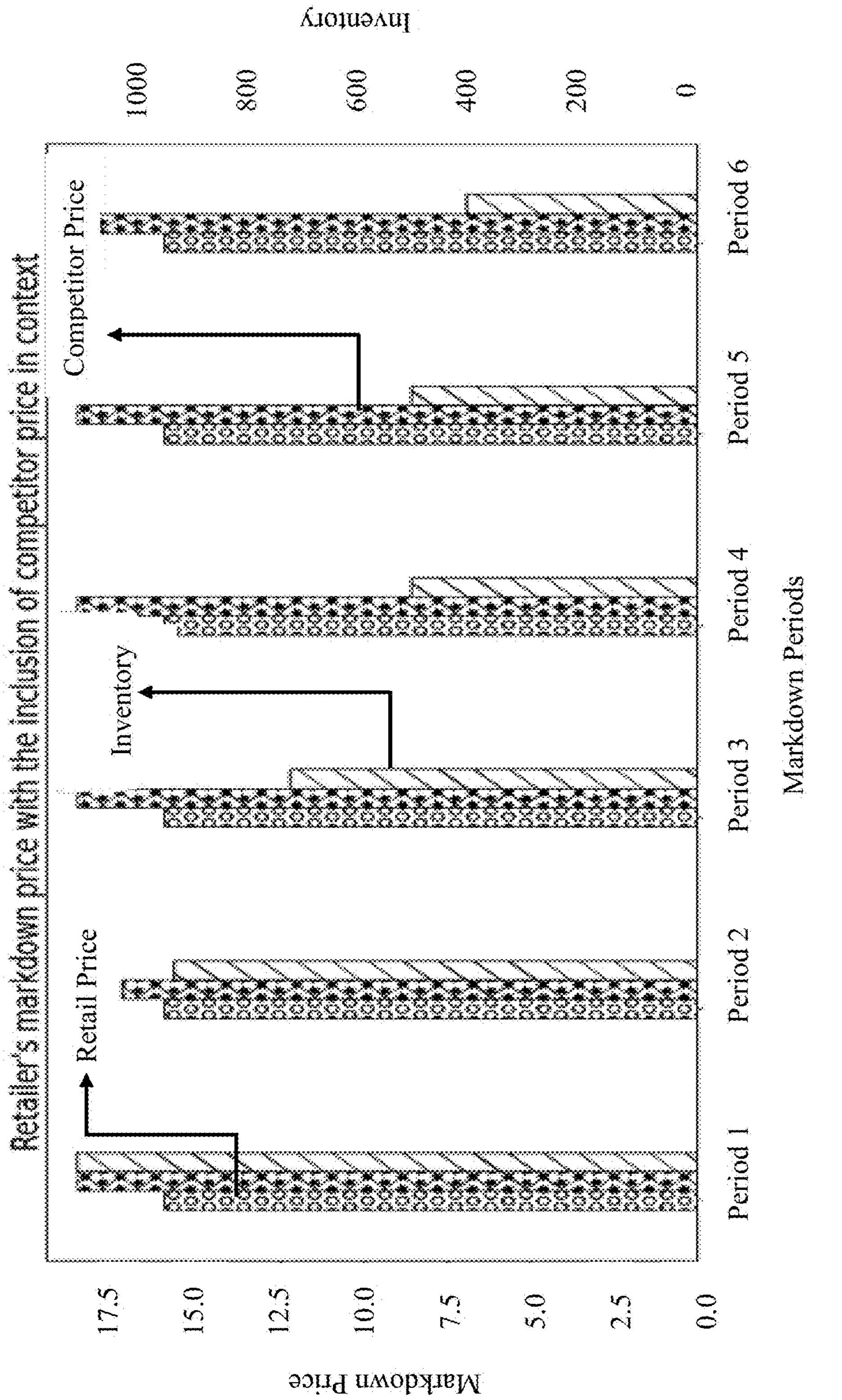
FIG. 7 illustrates inclusion of competitor price of previous markdown period as a context feature by including the customer and competitor features in accordance with some embodiments of the present disclosure.

The disclosed COMP model is employed to address this challenge. For this setting, competitor prices have been added pertaining to the most impactful competitor with a lag, as part of the context features. It is observed that COMP was able to learn and detect the impact of competitor's prices on the retailer's sales. The FIG. 7 illustrates inclusion of competitor price of previous markdown period as a context feature by including the customer and competitor features, the cumulative reward increased by 18.65%, by adapting to competition and accounting for sales variations due to customer preferences associated with different customer clusters.

Figure 8A:
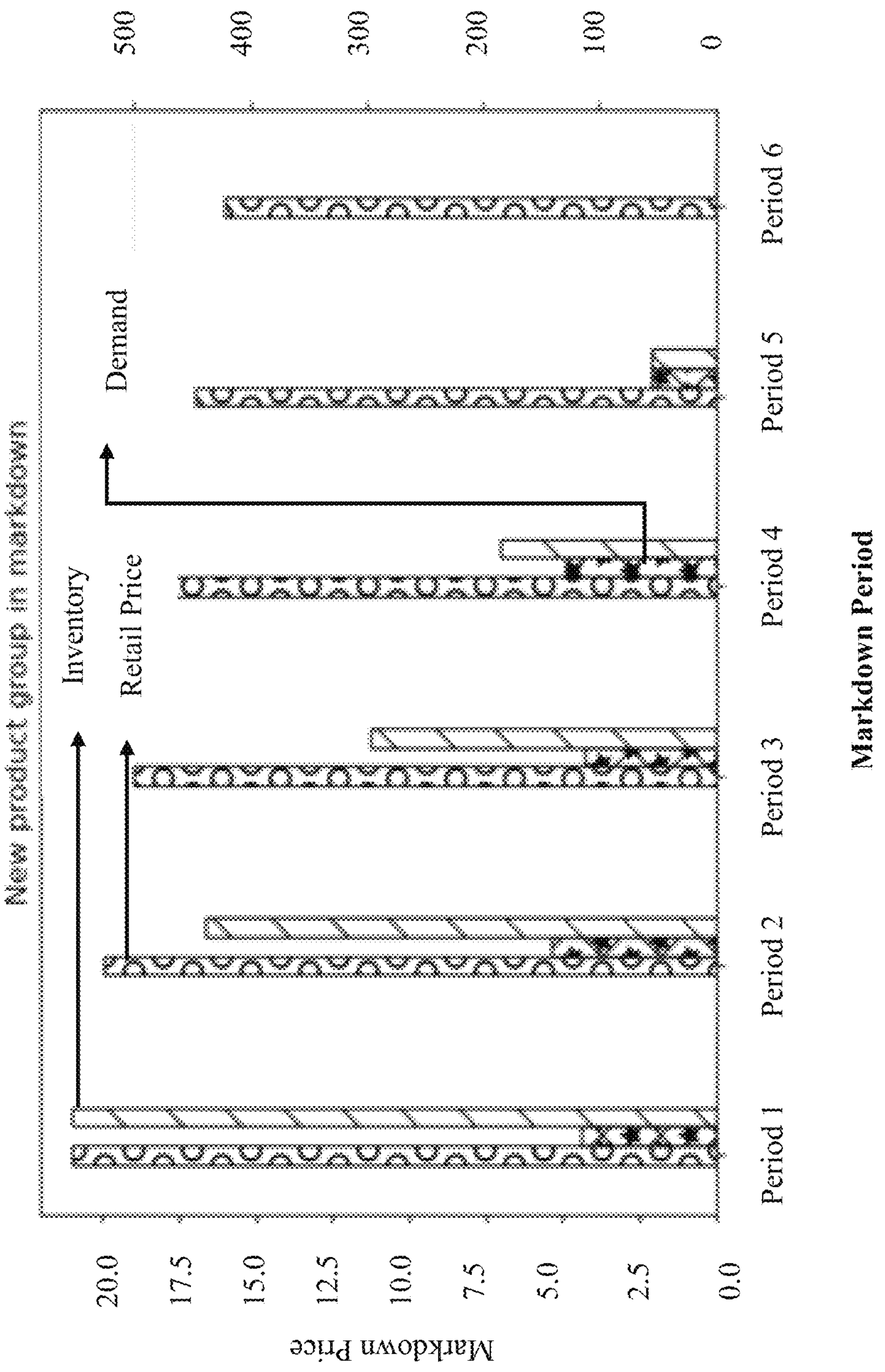
FIG. 8A and FIG. 8B illustrates markdown characteristics of buddy and new product group in the markdown duration in accordance with some embodiments of the present disclosure.
Figure 8B:
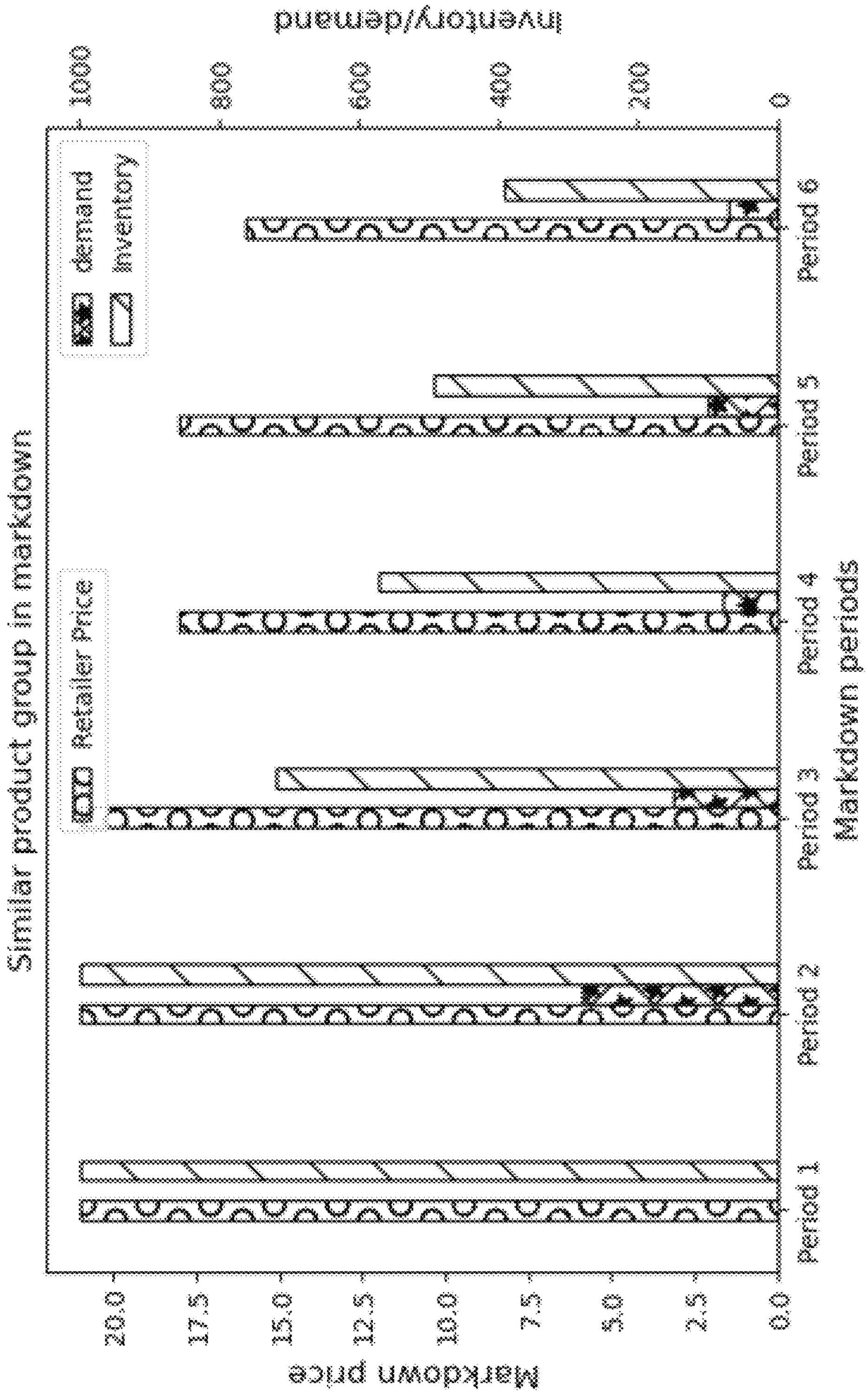

Markdown price recommendations for new product groups: Providing optimal markdown discounts for new product groups is a key challenge for retailers as they have no performance data, commonly referred to as the cold-start problem. Hence, to derive better priors and sales forecast for such product groups, markdown price and other transaction-based features were obtained from the buddy (similar) product groups in the current markdown season. A buddy product group is any product group belonging to the same hierarchy but has slightly different attributes in terms of color/pattern of print. A KNN regressor is employed with weighted attributes to identify similar product groups from Dataset 1 that uses scores derived from Euclidean distance-based similarity. Leveraging contextual information from the buddy product group, meaningful markdowns could be prescribed for the new product groups such that its inventory reaches zero within the markdown season of the current year. Therefore, the disclosed COMP model can also be employed in settings where data is scarce. The FIG. 8A and FIG. 8B illustrates markdown characteristics of buddy and new product group in the markdown duration and showcases the price, sales and inventory characteristics of the similar product group and the new product group for the markdown duration.

Figure 9:
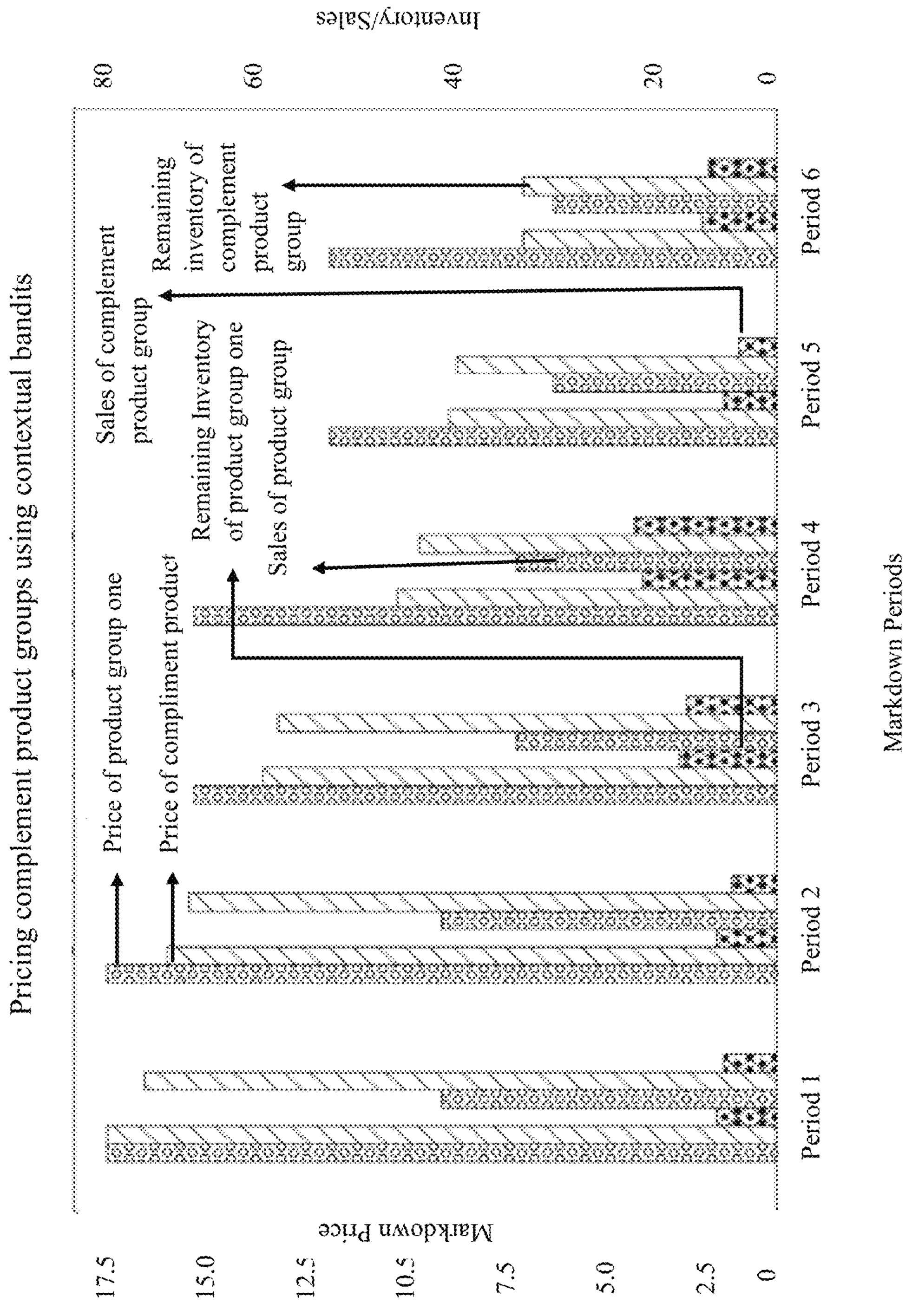
FIG. 9 illustrates pricing complement items using contextual bandit in accordance with some embodiments of the present disclosure.

Markdown pricing for inter-related product groups:

In online retail, it can be observed that items that are frequently bought together which don't belong to the same category/merchandise hierarchy. Example-Shirts and pants, socks, and shoes. For such inter-related items called complements, it is often recommended to offer similar markdown discounts to promote sales of both the items. To address the problem of pricing inter-related product groups, a complement product groups is identified that are frequently bought together, and have similar sales rate, and grouped them into a basket. The challenge here was to prescribe identical markdown discounts to all product groups in a basket considering the selling patterns and correlations between them. To solve this problem, a cross-price elasticity matrix (that captures the effect of price of an product group A on sales of product group B) and inter-related product group sales rate is used and is further added it as part of the context features for COMP model. The cross-price elasticity matrix was derived based on regression model run on the data that captured the transactional features corresponding to the last updated transaction data. The arms of the disclosed COMP model is added to that of markdown price to be offered for all product groups in a basket. Further, margin, sales forecast, and inventory is calculated at the basket level. The sales forecast used the cross-price elasticity matrix to forecast sales corresponding to these inter-related product groups. The FIG. 9 illustrates pricing complement items using contextual bandit and also showcases the markdown pricing results using disclosed techniques for a set of inter-related product groups in a basket. The plot shows that identical price is offered for these product groups such that their inventory depletion rate is uniform.

Hence, it is observed that the disclosed COMP model can effectively identify cross price effects with respect to inter-related product groups. The model can factor in potential cannibalization effects where optimizing discounts for one product negatively impacts sales of similar products. This improves accuracy. This was useful particularly in markdown pricing as it enables prescription of identical discounts for inter-related product groups such that inventory depletion rate of one product group does not curb the sales of the related product group.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to optimizing markdown price and, more particularly, to a method and a system for optimizing E-commerce markdown price based on contextual bandit technique. E-commerce and retail industries employ several strategies to boost business, of which markdown pricing is popular. The online markdown pricing problem is particularly challenging due to the high variability in demand. The existing state-of-art CB based techniques to optimize the markdown price, are designed to either clear off maximum inventory or as a revenue maximization problem and do not explicitly consider contextual features. The disclosed techniques optimize E-commerce markdown price based on contextual bandit technique focusing on both margin optimization and inventory reduction, while considering contextual features by employing a suite of Contextual Bandit (CB) algorithms, including LinUCB, Mini-monster in Vowpal Wabbit (VW), Contextual Thompson Sampling (CTS), and Bayes UCB, which tackle the dynamic nature of e-commerce. The optimization system is designed to integrate with key internal IT systems like ERP, PLM and eCommerce platforms. This enables automated use of contextual data and implementation of optimized markdown pricing changes.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving a plurality of inputs, via one or more hardware processors, wherein the plurality of inputs are associated with an e-commerce product, wherein the plurality of inputs comprise:

a plurality of products, wherein each product in the plurality of products is associated with a product group;

a plurality of inventory data associated with the plurality of products stored in a plurality of inventories, wherein the plurality of inventory data comprises a markdown period, an available inventory data, an initial available inventory, and a sell through percentage-for each inventory from the plurality of inventories;

a plurality of attribute data comprising a set of product attributes, a set of customer attributes, and a set of social media attributes;

a plurality of price master data comprising of a minimum markdown price, a maximum markdown price, a unit cost, and a markdown price;

a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute;

preprocessing the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques;

selecting a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique;

estimating a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes, wherein the set of context temporal attributes is estimated based on a XGBoost model handling non-linear dependencies and scales with multiple datasets;

estimating a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate;

optimizing the markdown price in real-time for the markdown product and the associated set of inter-related products during each markdown period of the plurality of pre-defined markdown periods based on a contextual bandit based online markdown pricing (COMP), via the one or more hardware processors, using the plurality of context data, the reward and the plurality of action arms, wherein the markdown price is optimized to maximize a cumulative reward, based on a set of constraints and a continuous feedback from the plurality of input, wherein the COMP includes bandits model that is trained across multiple computational nodes to speed up training process and thereby allowing optimization of markdown pricing at a scale to optimize markdown pricing for varied products, and the bandits model is tuned for sensitivity to hyperparameters including learning rates, epsilon values, and sample sizes, wherein the continuous feedback is performed by utilizing previous round's chosen markdown price as the maximum markdown price in a current round, and a remaining inventory is updated based on an initial inventory and a cumulative sum of sales quantity up to the current round, and at each iteration, and optimizing the markdown price for all markdown periods together with forecasted values and actual performance data as round progress, further continuously updating from previous round actual sales performance is fed forward to subsequent rounds, and the maximum markdown price is updated with previous round's markdown price;

wherein optimizing the markdown price is integrated with an eCommerce platform enabling automated use of the plurality of context data and implement changes in the optimized markdown pricing.

2. The method of claim 1, wherein the set of pre-processing techniques comprises:

the set of feature engineering techniques, wherein the set of feature engineering techniques comprises of a plurality of techniques to perform data cleaning-imputation of missing values, outlier removal, etc., data integration-merging data, removing conflicts, a set of parameters selection techniques, and data transformation, generalization, normalization, aggregation;

the product group level aggregation technique, wherein the product group level aggregation technique is performed for a product group at a pre-define level using a set of statistical techniques;

the set of data mining techniques, wherein the set of data mining techniques is used to identify a plurality of related products in the plurality of products; and the plurality of segmentation techniques, wherein the plurality of segmentation techniques is used to obtain set of contextual features using the set of customer attributes.

3. The method of claim 1, wherein the markdown product is selected based on the markdown product selection technique which includes computing a product eligibility score, wherein the product eligibility score is a function of the available inventory data, the set of product attributes, and the plurality of performance data.

4. The method of claim 1, wherein the plurality of context data is estimated using the plurality of aggregated inputs based on a set of context data estimation techniques, wherein the set of context data estimation techniques comprises:

a gradient boosting technique, wherein the gradient boosting technique is used to estimate the set of context temporal attributes;

a machine learning technique, wherein the set of context price attributes is estimated based on the machine learning techniques; and a set of data mining techniques, wherein the set of context product attributes is estimated based on the set of data mining techniques.

5. The method of claim 1, wherein the plurality of action arms and the reward is estimated based on the estimation technique, wherein:

(a) the plurality of action arms are a set of discrete price points within the minimum markdown price and the maximum markdown price, and (b) the reward is a weighted sum of the margin parameter and the inventory reduction rate, wherein:

the margin parameter is computed based on the sales quantity, the unit cost, and a markdown price, the inventory reduction rate is computed based on the available inventory data and the sales quantity, and (c) the cumulative reward is a summation of the margin parameters and the inventory reduction rates for all the markdown periods of the markdown duration.

6. The method of claim 1, wherein the COMP is an ensemble of a set of unsupervised reinforcement learning techniques for the markdown prices, wherein the unsupervised reinforcement learning technique comprises at least one of a LinUCB technique, a mini-monster in Vowpal Wabbit (VW) technique, a Contextual Thompson Sampling (CTS) technique, and Bayes Upper Confidence Bounds (UCB) technique.

7. The method of claim 1, wherein the optimization of the markdown price in real-time includes generating a cross-price elasticity matrix, and wherein the cross-price elasticity matrix for the markdown duration is generated using a regression technique based on the plurality of price master data, the set of product attributes, and the plurality of performance data, and wherein the cross-price elasticity matrix comprises a plurality of rows and a plurality of columns, wherein:

optimization of the markdown price in real-time for the associated set of inter-related products is performed using all the plurality of rows and the plurality of columns of the cross-price elasticity matrix, and optimization of the markdown price in real-time for the markdown product is performed using a diagonal of the cross-price elasticity matrix.

8. The method of claim 1, wherein the set of constraints comprises the minimum markdown price, the maximum markdown price, the plurality of competitor prices, and the plurality of inventory data.

9. A system, comprising:

a memory storing instructions;

one or more communication interfaces; and one or more hardware processors coupled to the memory via the one or more communication interfaces, wherein the one or more hardware processors are configured by the instructions to:

receive a plurality of inputs, via one or more hardware processors, wherein the plurality of inputs are associated with an e-commerce product, wherein the plurality of inputs comprise:

a plurality of products, wherein each product in the plurality of products is associated with a product group;

a plurality of inventory data associated with the plurality of products stored in a plurality of inventories, wherein the plurality of inventory data comprises a markdown period, an available inventory data, an initial available inventory, and a sell through percentage-for each inventory from the plurality of inventories;

a plurality of attribute data comprising a set of product attributes, a set of customer attributes, and a set of social media attributes;

a plurality of price master data comprising of a minimum markdown price, a maximum markdown price, a unit cost, and a markdown price;

a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute;

preprocess the plurality of inputs based on a set of pre-processing techniques, via the one or more hardware processors, to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques;

select a markdown product and an associated set of inter-related products for the markdown duration from the plurality of aggregated inputs, via the one or more hardware processors, based on the plurality of price master data, the set of product attributes, the plurality of market data, and the plurality of performance data, using a markdown product selection technique;

estimate a plurality of context data using the plurality of aggregated inputs, the set of customer attributes, and the set of social media attributes, via the one or more hardware processors, based on a set of context data estimation techniques for each markdown period of the plurality of pre-defined markdown periods, wherein the context data comprises a set of context product attributes, a set of context price attributes, and a set of context temporal attributes, wherein the set of context temporal attributes is estimated based on a XGBoost model handling non-linear dependencies and scales with multiple datasets;

estimate a plurality of action arms and a reward for the markdown product and the associated set of inter-related products for the markdown duration, via the one or more hardware processors, based on an estimation technique using the plurality of attribute data, the plurality of price master data, and the plurality of performance data, wherein the reward comprises a margin parameter and an inventory reduction rate;

optimize the markdown price in real-time for the markdown product and the associated set of inter-related products during each markdown period of the plurality of pre-defined markdown periods based on a contextual bandit based online markdown pricing (COMP), via the one or more hardware processors, using the plurality of context data, the reward and the plurality of action arms, wherein the markdown price is optimized to maximize a cumulative reward, based on a set of constraints and a continuous feedback from the plurality of input, wherein the COMP includes bandits model that is trained across multiple computational nodes to speed up training process and thereby allowing optimization of markdown pricing at a scale to optimize markdown pricing for varied products, and the bandits model is tuned for sensitivity to hyperparameters including learning rates, epsilon values, and sample sizes, wherein the continuous feedback is performed by utilizing previous round's chosen markdown price as the maximum markdown price in a current round, and a remaining inventory is updated based on an initial inventory and a cumulative sum of sales quantity up to the current round; and optimizing the markdown price for all markdown periods together with forecasted values and actual performance data as round progress, further continuously updating from previous round actual sales performance is fed forward to subsequent rounds, and the maximum markdown price is updated with previous round's markdown price, wherein optimizing the markdown price is integrated with an eCommerce platform enabling automated use of the plurality of context data and implement changes in the optimized markdown pricing.

10. The system of claim 9, wherein the set of preprocessing techniques comprises:

the set of feature engineering techniques, wherein the set of feature engineering techniques comprises of a plurality of techniques to perform data cleaning-imputation of missing values, outlier removal, etc., data integration-merging data, removing conflicts, a set of parameters selection techniques, and data transformation, generalization, normalization, aggregation;

the product group level aggregation technique, wherein the product group level aggregation technique is performed for a product group at a pre-define level using a set of statistical techniques;

the set of data mining techniques, wherein the set of data mining techniques is used to identify a plurality of related products in the plurality of products; and the plurality of segmentation techniques, wherein the plurality of segmentation techniques is used to obtain set of contextual features using the set of customer attributes.

11. The system of claim 9, wherein the markdown product is selected based on the markdown product selection technique which includes computing a product eligibility score, wherein the product eligibility score is a function of the available inventory data, the set of product attributes, and the plurality of performance data.

12. The system of claim 9, wherein the plurality of context data is estimated using the plurality of aggregated inputs based on a set of context data estimation techniques, wherein the set of context data estimation techniques comprises:

a gradient boosting technique, wherein the gradient boosting technique is used to estimate the set of context temporal attributes;

a machine learning technique, wherein the set of context price attributes is estimated based on the machine learning techniques; and a set of data mining techniques, wherein the set of context product attributes is estimated based on the set of data mining techniques.

13. The system of claim 9, the plurality of action arms and the reward is estimated based on the estimation techniques wherein:

(a) the plurality of action arms are a set of discrete price points within the minimum markdown price and the maximum markdown price, and (b) the reward is a weighted sum of the margin parameter and the inventory reduction rate, wherein:

the margin parameter is computed based on the sales quantity, the unit cost, and a markdown price, the inventory reduction rate is computed based on the available inventory data and the sales quantity, and (c) the cumulative reward is a summation of the margin parameters and the inventory reduction rates for all the markdown periods of the markdown duration.

14. The system of claim 9, wherein:

the COMP is an ensemble of a set of unsupervised reinforcement learning techniques for the markdown prices, wherein the unsupervised reinforcement learning technique comprises at least one of a LinUCB technique, a mini-monster in Vowpal Wabbit (VW) technique, a Contextual Thompson Sampling (CTS) technique, and Bayes Upper Confidence Bounds (UCB) technique, the set of constraints comprises the minimum markdown price, the maximum markdown price, the plurality of competitor prices, and the plurality of inventory data, and the optimization of the markdown price in real-time includes generating a cross-price elasticity matrix, and wherein the cross-price elasticity matrix for the markdown duration is generated using a regression technique based on the plurality of price master data, the set of product attributes, and the plurality of performance data, and wherein the cross-price elasticity matrix comprises a plurality of rows and a plurality of columns, wherein:

optimization of the markdown price in real-time for the associated set of inter-related products is performed using all the plurality of rows and the plurality of columns of the cross-price elasticity matrix, and optimization of the markdown price in real-time for the markdown product is performed using a diagonal of the cross-price elasticity matrix.

15. One or more non-transitory machine-readable information storage mediums comprising one or more instructions which when executed by one or more hardware processors cause to:

receive a plurality of inputs, wherein the plurality of inputs are associated with an e-commerce product, wherein the plurality of inputs comprise:

a plurality of products, wherein each product in the plurality of products is associated with a product group;

a plurality of inventory data associated with the plurality of products stored in a plurality of inventories, wherein the plurality of inventory data comprises a markdown period, an available inventory data, an initial available inventory, and a sell through percentage-for each inventory from the plurality of inventories;

a plurality of attribute data comprising a set of product attributes, a set of customer attributes, and a set of social media attributes;

a plurality of price master data comprising of a minimum markdown price, a maximum markdown price, a unit cost, and a markdown price;

a set of markdown timeframes comprising a markdown duration, and a plurality of pre-defined markdown periods; and a plurality of performance data comprising of a regular price, a sales quantity, and a plurality of market data, wherein the plurality of market data comprises of a competitor markdown price, an economic attribute and a demographic attribute;

preprocess the plurality of inputs based on a set of pre-process techniques to obtain a plurality of aggregated inputs, wherein the set of pre-processing techniques comprises of: (a) a set of feature engineering techniques, (b) Product group level aggregation techniques, (c) a set of data mining techniques, and (d) a plurality of segmentation techniques;

select a markdown product and an associated set of inter-related products for the markdown duration from the plurality of aggregated inputs, based on the plurality of price master data, the set of product attributes, the plurality of market data, and the plurality of performance data, using a markdown product selection technique;

estimate a plurality of context data using the plurality of aggregated inputs, the set of customer attributes, and the set of social media attributes, based on a set of context data estimation techniques for each markdown period of the plurality of pre-defined markdown periods, wherein the context data comprises a set of context product attributes, a set of context price attributes, and a set of context temporal attributes, wherein the set of context temporal attributes is estimated based on a XGBoost model handling non-linear dependencies and scales with multiple datasets;

estimate a plurality of action arms and a reward for the markdown product and the associated set of inter-related products for the markdown duration, based on an estimation technique using the plurality of attribute data, the plurality of price master data, and the plurality of performance data, wherein the reward comprises a margin parameter and an inventory reduction rate;

optimize the markdown price in real-time for the markdown product and the associated set of inter-related products during each markdown period of the plurality of pre-defined markdown periods based on a contextual bandit based online markdown pricing (COMP), using the plurality of context data, the reward and the plurality of action arms, wherein the markdown price is optimized to maximize a cumulative reward, based on a set of constraints and a continuous feedback from the plurality of input, wherein the COMP includes bandits model that is trained across multiple computational nodes to speed up training process and thereby allowing optimization of markdown pricing at a scale to optimize markdown pricing for varied products, and the bandits model is tuned for sensitivity to hyperparameters including learning rates, epsilon values, and sample sizes, wherein the continuous feedback is performed by utilizing previous round's chosen markdown price as the maximum markdown price in a current round, and a remaining inventory is updated based on an initial inventory and a cumulative sum of sales quantity up to the current round;

optimizing the markdown price for all markdown periods together with forecasted values and actual performance data as round progress, further continuously updating from previous round actual sales performance is fed forward to subsequent rounds, and the maximum markdown price is updated with previous round's markdown price; and wherein optimizing the markdown price is integrated with an eCommerce platform enabling automated use of the plurality of context data and implement changes in the optimized markdown pricing.

16. The one or more non-transitory machine-readable information storage mediums of claim 15, wherein the set of pre-processing techniques comprises:

the set of feature engineering techniques, wherein the set of feature engineering techniques comprises of a plurality of techniques to perform data cleaning-imputation of missing values, outlier removal, etc., data integration-merging data, removing conflicts, a set of parameters selection techniques, and data transformation, generalization, normalization, aggregation;

the product group level aggregation technique, wherein the product group level aggregation technique is performed for a product group at a pre-define level using a set of statistical techniques;

the set of data mining techniques, wherein the set of data mining techniques is used to identify a plurality of related products in the plurality of products; and the plurality of segmentation techniques, wherein the plurality of segmentation techniques is used to obtain set of contextual features using the set of customer attributes.

17. The one or more non-transitory machine-readable information storage mediums of claim 15, wherein the markdown product is selected based on the markdown product selection technique which includes computing a product eligibility score, wherein the product eligibility score is a function of the available inventory data, the set of product attributes, and the plurality of performance data.

18. The one or more non-transitory machine-readable information storage mediums of claim 15, wherein the plurality of context data is estimated using the plurality of aggregated inputs based on a set of context data estimation techniques, wherein the set of context data estimation techniques comprises:

a gradient boosting technique, wherein the gradient boosting technique is used to estimate the set of context temporal attributes;

a machine learning technique, wherein the set of context price attributes is estimated based on the machine learning techniques; and a set of data mining techniques, wherein the set of context product attributes is estimated based on the set of data mining techniques.

19. The one or more non-transitory machine-readable information storage mediums of claim 15, wherein the plurality of action arms and the reward is estimated based on the estimation technique, wherein:

(d) the plurality of action arms are a set of discrete price points within the minimum markdown price and the maximum markdown price, and (e) the reward is a weighted sum of the margin parameter and the inventory reduction rate, wherein:

the margin parameter is computed based on the sales quantity, the unit cost, and a markdown price, the inventory reduction rate is computed based on the available inventory data and the sales quantity, and (f) the cumulative reward is a summation of the margin parameters and the inventory reduction rates for all the markdown periods of the markdown duration.

20. The one or more non-transitory machine-readable information storage mediums of claim 15, wherein the COMP is an ensemble of a set of unsupervised reinforcement learning techniques for the markdown prices, wherein the unsupervised reinforcement learning technique comprises at least one of a LinUCB technique, a mini-monster in Vowpal Wabbit (VW) technique, a Contextual Thompson Sampling (CTS) technique, and Bayes Upper Confidence Bounds (UCB) technique.

* * * * *